(12) United States Patent
Neeter

(10) Patent No.: US 11,379,287 B2
(45) Date of Patent: Jul. 5, 2022

(54) SYSTEM AND METHOD FOR ERROR DETECTION AND CORRECTION IN VIRTUAL REALITY AND AUGMENTED REALITY ENVIRONMENTS

(71) Applicant: FactualVR, Inc., Jersey City, NJ (US)

(72) Inventor: Eduardo Neeter, Jersey City, NJ (US)

(73) Assignee: FactualVR, Inc., Jersey City, NJ (US)

( * ) Notice: Subject to any disclaimer, the term of this patent is extended or adjusted under 35 U.S.C. 154(b) by 112 days.

(21) Appl. No.: 16/932,328

(22) Filed: Jul. 17, 2020

(65) Prior Publication Data

US 2021/0019215 A1  Jan. 21, 2021

Related U.S. Application Data

(60) Provisional application No. 62/875,368, filed on Jul. 17, 2019.

(51) Int. Cl.
| | |
|---|---|
| *G06F 11/07* | (2006.01) |
| *G06T 19/00* | (2011.01) |
| *G06N 20/00* | (2019.01) |
| *G06F 3/01* | (2006.01) |

(52) U.S. Cl.
CPC .......... *G06F 11/0751* (2013.01); *G06F 3/011* (2013.01); *G06F 11/0733* (2013.01); *G06N 20/00* (2019.01); *G06T 19/006* (2013.01)

(58) Field of Classification Search
CPC .. G06F 11/0751; G06F 11/0733; G06F 3/011; G06F 11/3438; G06F 2201/86; G06F 11/07; G06F 3/01; G06F 3/017; G06F 3/0484; G06T 19/006; G06T 19/00; G06T 3/00; G06T 19/20; G06T 2207/20081; G06N 20/00; G06N 5/003; G06N 3/02; G06N 3/08; G06Q 10/063112; G06Q 10/06316; G09B 19/003; G09B 5/02; G09B 5/14

See application file for complete search history.

(56) References Cited

U.S. PATENT DOCUMENTS

| | | | |
|---|---|---|---|
| 2009/0237564 A1 | 9/2009 | Kikinis et al. | |
| 2015/0058102 A1 | 2/2015 | Christensen et al. | |
| 2016/0077547 A1 | 3/2016 | Aimone et al. | |
| 2017/0053440 A1 | 2/2017 | Yoon et al. | |
| 2017/0285738 A1 | 10/2017 | Khalid | |
| 2019/0114482 A1* | 4/2019 | Li | G06Q 10/06 |
| 2019/0302761 A1* | 10/2019 | Huang | G06F 3/00 |
| 2020/0357299 A1* | 11/2020 | Patel | G16H 20/30 |

OTHER PUBLICATIONS

International Search Report and Written Opinion from related International Patent Application No. PCT/US2020/042584 dated Oct. 7, 2020.

\* cited by examiner

*Primary Examiner* — Xilin Guo
(74) *Attorney, Agent, or Firm* — Nelson Mullins Riley & Scarborough LLP; Anthony A. Laurentano

(57) ABSTRACT

Embodiments of the present disclosure are related to training one or more of machine learning algorithms in a virtual reality environment for error detection and correction and/or for employing one or more trained machine learning models in an augmented reality environment to detect and/or correct user errors associated the performance of one or more tasks.

19 Claims, 9 Drawing Sheets

SYSTEM AND METHOD FOR ERROR DETECTION AND CORRECTION IN VIRTUAL REALITY AND AUGMENTED REALITY ENVIRONMENTS

RELATED APPLICATIONS

The present application claims priority to and the benefit of U.S. Provisional Application No. 62/875,368, filed on Jul. 17, 2019, the disclosure of which is incorporated by reference herein in its entirety.

GOVERNMENT RIGHTS

This invention was made with government support under DE-SC0018732 awarded by Department of Energy, United States of America. The government has certain rights in the invention.

BACKGROUND

Providing hands on training can be difficult and can result in operational inefficiencies. Additionally, as the workforce ages and experienced workers retire, there can be discontinuities in the transfer of knowledge and skills to less experienced workers.

SUMMARY

Embodiments of the present disclosure are related to training one or more of machine learning algorithms in a virtual reality environment for error detection and/or correction and/or for employing one or more trained machine learning models in an augmented reality environment to detect and/or correct user errors.

In accordance with embodiments, a system for error detection in a virtual reality and/or augmented reality environment is disclosed. The system includes a virtual reality device, one or more non-transitory computer-readable media, and processing device. The one or more non-transitory computer-readable media storing a data structure corresponding to a set of tasks and instructions for training one or more machine learning algorithms. The processing device can execute the instructions to: generate a virtual reality scene model to simulate a real-world, physical location; render the virtual reality scene model on the virtual reality device to immerse a user of the virtual reality device in the virtual reality scene model; capture actions of the user simulating a performance of the set of tasks; train the one or more machine learning algorithms to detect differences between the actions of the user and the set of tasks to generate one or more trained machine learning models; and deploy the one or more trained machine learning models in the virtual reality environment and/or an augmented reality environment.

In accordance with embodiments of the present disclosure, a method for error detection in a virtual reality environment and/or an augmented reality environment is disclosed. The method can include defining a data structure corresponding to a set of tasks; generating a virtual reality scene model to simulate a real-world, physical location; rendering the virtual reality scene model on a virtual reality device to immerse a user of the virtual reality device in the virtual reality scene model; capturing actions of the user simulating a performance of the set of tasks; training one or more machine learning algorithms to detect differences between the actions of the user and the set of tasks to generate one or more trained machine learning models; and deploying the one or more trained machine learning models in the virtual reality environment and/or an augmented reality environment.

In accordance with embodiments, a non-transitory computer-readable medium is disclosed, wherein execution of the instructions by a processing device causes the processing device to: generate a virtual reality scene model to simulate a real-world, physical location; render the virtual reality scene model on the virtual reality device to immerse a user of the virtual reality device in the virtual reality scene model; capture actions of the user simulating a performance of the set of tasks; train the one or more machine learning algorithms to detect differences between the actions of the user and the set of tasks to generate one or more trained machine learning models; and deploy the one or more trained machine learning models in the virtual reality environment and/or an augmented reality environment.

In accordance with embodiments, the set of tasks can have a hierarchical tree structure that define an ordered sequence of the tasks in the set and/or can include at least one of audible cues, user movements, or user interaction with objects.

In accordance with embodiments of the present disclosure, input can be from an observer of the user simulating the performance of the set of tasks, where the input corresponds to the actions of the user and the set of tasks, and/or where the input from the observer is utilized in training the one or more machine learning algorithms.

In accordance with embodiments of the present disclosure, the processing device is programmed to capture the actions of the user by capturing an audible output of the user, a movement of the user, and/or an interaction between the user and a virtual object.

In accordance with embodiments of the present disclosure, the processing device or a different processing device can be programmed to: capture actions of the user or a different user in a real-world, physical location, the user or the different user utilizing an augmented reality device; execute the one or more trained machine learning models to determine whether the actions of the user or the different user are deviating from the set of tasks; and generate a feedback signal to correct the user or the different user in the augmented reality environment based on the one or more trained machine learning models determining at least one of the actions is deviating from a corresponding task in the set of tasks. The actions of the user of the different user can be captured by capturing an audible output of the user, a movement of the user or the different user, and/or an interaction between the user or the different user and an actual object. The one or more trained machine learning models can include a first trained machine learning model and a second trained machine learning model. The first trained machine learning model can be executed to determine deviations in the audible output and the second trained machine learning model can be executed to determine deviations in the movement of the user or the different user and in the interaction between the user or the different user and the actual object. The one or more trained machine learning models can identify the actions of the user or the different user and determine whether the actions as identified are occurring at a desired time.

In accordance with embodiments of the present disclosure, the processing device or a different processing device can be programmed to: capture the actions of the user or a different user in the virtual reality scene model, the user or the different user utilizing the virtual reality device; execute the one or more trained machine learning models to determine whether the actions of the user or the different user are deviating from the set of tasks; and generate a feedback signal to correct the user or the different user in the virtual reality environment based on the one or more trained machine learning models determining at least one of the actions is deviating from a corresponding task in the set of tasks.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

DETAILED DESCRIPTION

Embodiments of the present disclosure are related to training one or more of machine learning algorithms in a virtual reality environment for error detection and/or correction and/or for employing one or more trained machine learning models in an augmented reality environment to detect and/or correct user errors. Virtual reality environments can be used to train the machine learning algorithms to generate the machine learning models based on users simulating the performance of a set of tasks corresponding to routines or procedures to be carried out by a user. Subsequently, the generated machine learning models can be deployed in an augmented reality environment so that when users in a real-world physical scene actual perform the routines or procedures, the system (using the trained machine learning models) can determine whether the user is performing the activities and actions associated with the routine or procedure are being performed correct and in the correct sequence.

Figure 1:
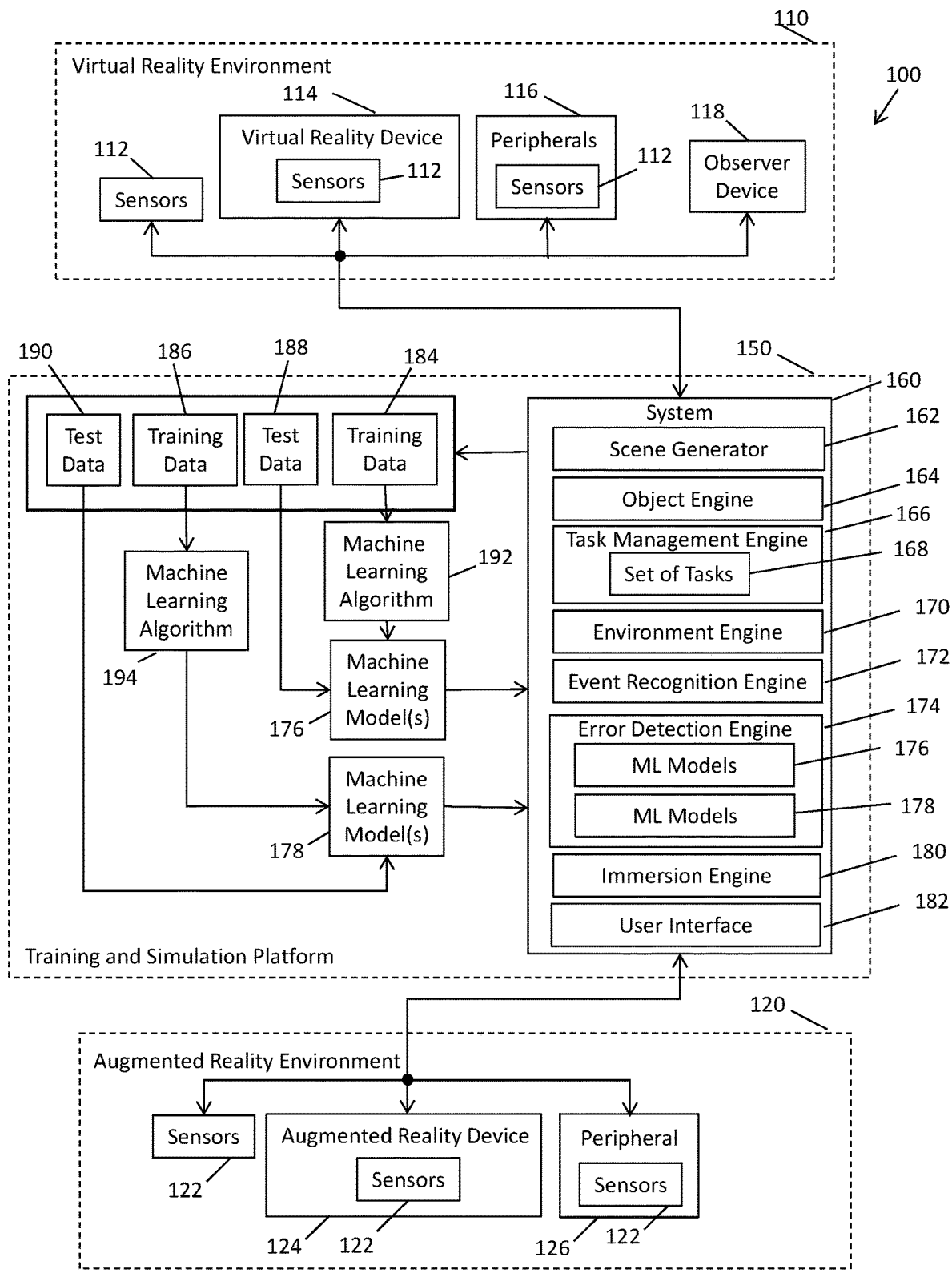
FIG. 1 is a block diagram of an environment for training and/or employing one or more machine learning models to detect and/or correct user errors in accordance with embodiments of the present disclosure.

FIG. 1 is a block diagram of an exemplary environment 100 for training one or more of machine learning algorithms in a virtual reality environment for error detection and/or correction and/or for employing one or more trained machine learning models in an augmented reality environment to detect and/or correct user errors in accordance with embodiments of the present disclosure. The environment 100 can include a virtual reality environment 110, an augment reality environment 120, and a virtual training and/or simulation platform 150.

The virtual reality environment 110 can include sensors 112, a virtual reality device 114, peripheral devices 116, and an observer device 118. As a non-limiting example, the sensors 112 can be worn or otherwise carried by users and/or can be distributed about the users. Each sensor 112 can represent, for example, can sense or detect an audible output from the users, movements of the users, locations of the users, a pose of the users, interactions between the users and objects, and/or can detect or sense environment information (e.g., temperature, humidity, gases, voltages, electrical currents, etc.). Output data from the data sensors 112 can be stored in computer storage and can be associated with sessions of the users in the virtual reality environment. The sensors 112 can include depth sensors, magnetic sensors, optical sensors, inertial sensors, acoustic sensors, imaging sensors, inductive sensors, capacitive sensors, piezoelectric sensors, and/or any type of sensor that can sense or detect an audible output from the users, movements of the users, locations of the users, an interaction between the users and objects, and/or environmental data. For example, the sensors 112 can include, but are not limited to, accelerometers, gyroscopes, motion detectors, proximity sensors, transducers (e.g., audio microphones, speakers), altitude sensors, pressure sensors, touch-sensitive sensors, cameras (e.g., video cameras, night vision cameras, thermal cameras, infrared cameras, three-dimension (3D) scanning cameras, heat sensors (e.g., thermistors, thermometers), chemical sensors, humidity sensors, and/or depth sensors. In some embodiments, environment information in the virtual reality environment can be extracted from attributes of virtual objects in the virtual reality scene. Object recognition can be used to identify virtual objects in the virtual reality environment based on images of the virtual reality scene model and attributes of the identified virtual objects can be extracted from the identified virtual reality objects. For example, a virtual object in the virtual reality scene can be a thermometer or gauge, and a temperature of the environment can be determined by identifying the object as thermometer using one or more of the sensors (e.g., via machine vision) to extract the temperature from the image(s) of the thermometer.

The virtual reality device 114 can be configured to provide an immersive environment in which a user views a three-dimensional virtual reality scene model rendered on one or more displays using a stereoscopic effect. In exemplary embodiments, the virtual reality device 114 can be a head mounted display device. The virtual reality device 114 can include one or more of the sensors 112. The sensors 112 included with the virtual reality device 114 can output sensor data that can be transmitted by the virtual reality device 114 to another device. The virtual reality device 114 can transmit the sensor data via a wired or wireless connection, including but not limited to, a USB connection, a cellular connection, a WiFi connection, a Bluetooth connection, Zigbee, etc. The sensor data can be live streamed for immediate use or can be stored for later use. As one example, the sensors 112 on the virtual reality device 114 can include accelerometers, gyroscopes, and/or cameras for tracking or monitoring movement of the users, interactions between the user and objects, a location of the user, a pose of the user, and/or for tracking eye movements of the user of the virtual reality device 114.

The peripheral devices 116 can include one or more articles that can be worn or carried by the user of the virtual reality device 114. For example, the peripheral devices 116 can include a torso device, hand devices, waist device, feet devices, and/or any other suitable devices that can be worn or carried by the user.

The torso device includes any type of wearable device that can track the user's torso relative to a position of the virtual reality device 114. For example, the torso equipment can include an article of clothing (e.g., shirt, vest, strap, scarf, necklace, etc.) that can include one or more of the sensors 112. For example, the sensors 112 can be attached or embedded in the torso device.

The hand devices can include a wrist or arm device (e.g., a watch, a smartwatch, a band, etc.), a finger device (e.g., a ring), a hand device (e.g., gloves), a joystick, or any other hand/wrist/arm wearable device or a device that can be carried by the user. The hand devices can include one or more of the sensors 112 to sense or detect location, movement, a user command, interactions between the user and objects, etc. For example, the hand devices can allow the user to use his hands as an input device, by capturing hand movements, finger movements, and overall hand and/or finger gestures. As one example, a user command can be executed by touching two fingers together with a glove, pressing a button on the joystick, or moving a hand in a direction, etc. As another example, a user's hands can be tracked by one or more of the sensors of the virtual reality device 114, by one or more of the sensors in the torso device, or by a combination of one or more of the sensors from the virtual reality device and the torso device, which can allow for tracking of the user's hands without the user wearing the hand devices.

The waist device includes any type of wearable device that can sense track the user's waist relative to a position of the virtual reality device 114. For example, the waist device can be a belt or a sash having one or more of the sensors 112 attached to or integrated therewith. The waist device can be an extension of tracking the user's torso. The area of the user's torso and the area of the user's waist are differentiated to provide different interpretation to the user's gestures interacting with objects in virtual reality environment 114.

The observer device 118 can be used by an observer that observes the user of the virtual reality device 114 while the user is interacting with the virtual reality environment. The observer can enter observational data, via the observer device, about actions taken by the user in the virtual reality environment and/or environmental data at the location within which the virtual reality device is being used. As one example, the observational data can include information about the audible output from the user of the virtual reality device, a movement of the user of the virtual reality device, and/or an interaction between the user of the virtual reality device and the objects. The observational data can be correlated to the sensor data and used by the platform 150 to train one or machine learning models to detect and/or correct errors in actions performed by the user in relation to a specified set of tasks. The observer device can be a computing device, such as a mobile/smart phone, a tablet, laptop computer, personal/desktop computer, another virtual reality device, and/or the like.

In an exemplary embodiment, the observer can use a virtual reality device or other device to view the same virtual reality scene as the user of the virtual reality device 114 and can view the user in the virtual reality scene view the observer's virtual reality device. The observer, via virtual reality device or other device, can observe the audible output from the user of the virtual reality device, a movement of the user of the virtual reality device, and/or an interaction between the user of the virtual reality device and the objects in the virtual reality scene and can generate observational data based on the observations.

The augmented reality environment 120 can include sensors 122, an augmented reality device 124, and peripheral devices 126. As a non-limiting example, the sensors 122 can be worn or otherwise carried by users and/or can be distributed about the users. Each sensor 122 can sense or detect an audible output from the users, movements of the users, locations of the users, a pose of the users, interactions between the users and objects, and/or that can detect or sense environment information (e.g., temperature, humidity, gases, voltages, electrical currents, etc.). Output data from the sensors 122 can be stored in computer storage and can be associated with sessions of the users in the augmented reality environment. The sensors 122 can include depth sensors, magnetic sensors, optical sensors, inertial sensors, acoustic sensors, imaging sensors, inductive sensors, capacitive sensors, piezoelectric sensors and/or any type of sensor that can sense or detect an audible output from the users, movements of the users, locations of the users, an interaction between the users and objects, and/or that can detect or sense environment information. For example, the sensors 122 can include, but are not limited to, accelerometers, gyroscopes, motion detectors, proximity sensors, transducers (e.g., microphones, speakers), altitude sensors, pressure sensors, touch-sensitive sensors, cameras (e.g., video cameras, night vision cameras, thermal cameras, infrared cameras, three-dimension (3D) scanning cameras, heat sensors (e.g., thermistors, thermometers), chemical sensors, humidity sensors, and/or depth sensors. In some embodiments, environment information in the augmented reality environment can be extracted from attributes of virtual objects and/or actual objects in the augmented reality environment. Object recognition can be used to identify virtual objects and/or actual objects in the augmented reality environment based on images of the virtual objects and/or actual objects and attributes of the identified virtual and/or actual objects can be extracted from the identified virtual and/or actual objects. For example, a virtual object or an actual object in the augmented reality environment can be a thermometer or gauge, and a temperature of the environment can be determined by identifying the object as thermometer using one or more of the sensors (e.g., via machine vision) to extract the temperature from the image(s) of the thermometer.

The augmented reality device 124 can allow the user to view a real-world physical scene and can augment the user's view of the real-world, physical scene. As one example, the augmented reality device 124 can include one or more displays that render a live view the real-world, physical scene and can superimpose, add, or delete objects in the displayed live view. As another example, the augmented reality device 124 can include one or more see-through lenses integrated with or operatively coupled to displays that allow the user to directly view the real-world scene through the lens, where the displays can superimpose, add, or delete objects in the users field-of-view to augment the real-world physical scene.

The augmented reality device 124 can include one or more of the sensors 122. The sensors 122 included with the augmented reality device can output sensor data that can be transmitted by the augmented reality device 124 to another device. The augmented reality device 124 can transmit the sensor data via a wired or wireless connection, including but not limited to, a USB connection, a cellular connection, a WiFi connection, a Bluetooth connection, Zigbee, etc. The sensor data can be live streamed for immediate use or stored for later use. As one example, the sensors 122 on the augmented reality device can include a camera and a user can transmit a live view from the camera on the augmented reality display 124 to another device that can be figured to render the live view on another display that is viewable by a further user so that the further user can view the real-world physical scene from the point-of-view of the user with or without the further user being in the same location as the user of the augmented reality device 124. As another example, the user can record sensor data output from the one or more sensor included in the augment reality device 124, and can transmit the recorded sensor data to be stored by another device for future use.

The peripheral devices 126 can include one or more articles that can be worn or carried by the user of the augmented reality device 124. For example, the peripheral devices can include a torso device, hand devices, waist device, feet devices, and/or any other suitable devices that can be worn or carried by the user.

The torso device includes any type of wearable device that can track the user's torso relative to a position of the augmented reality device 124. For example, the torso equipment can include an article of clothing (e.g., shirt, vest, strap, scarf, necklace, etc.) that can include one or more of the sensors 122. For example, the sensors 122 can be attached or embedded in the torso device.

The hand devices can include a wrist or arm device (e.g., a watch, a smartwatch, a band, etc.), a finger device (e.g., a ring), a hand device (e.g., gloves), a joystick, or any other hand/wrist/arm wearable device or a device that can be carried by the user. The hand devices can include one or more of the sensors 122 to sense or detect location, movement, a user command, interactions between the user and objects, etc. For example, the hand devices can allow the user to use his hands as an input device, by capturing hand movements, finger movements, and overall hand and/or finger gestures. As one example, a user command can be executed by touching two fingers together with a glove, pressing a button on the joystick, or moving a hand in a direction, etc. As another example, a user's hands can be tracked by one or more of the sensors in the augmented reality device, by one or more of the sensors in the torso device, or by a combination of one or more of the sensors from the augmented reality device and the torso device, which can allow for tracking of the user's hands without the user wearing the hand devices.

The waist device includes any type of wearable device that can sense track the user's waist relative to a position of the augmented reality device 124. For example, the waist device can be a belt or a sash having one or more of the sensors attached to or integrated therewith. The waist device can be an extension of tracking the user's torso. The area of the user's torso and the area of the user's waist are differentiated to provide different interpretation to the user's gestures interacting with objects in augmented reality environment 124.

The platform 150 can include a system 160 programmed to interface with the virtual reality environment 110 to execute virtual reality sessions and to interface with the augmented reality environment 120 to execute augmented reality sessions. The system 160 can include a scene scanning and generation engine 162, object recognition and mapping engine 164, task management engine 166, an environment engine 170, event recognition engine 172, error detection and correction engine 174, immersion engine 180, and/or user interface 182.

The scene scanning and generation engine 162 can facilitate the scanning of a real-world physical scene and the generation of a virtual, augmented, and/or mixed reality scene corresponding to the real-world physical scene. The scanning of a real-world physical scene can be performed by hand-held devices, stationary devices, and/or head-mounted devices using LIDAR scanners, structured light sensors, low-resolution stereo cameras, passive sensors, and/or active sensors to generate 3D models of the real-world physical scene. In some embodiments, depending on the cameras and/or sensors available for the scanning process, 3D models of the scene, focusing on the objects of interest can be obtained using photogrammetry or RGB-D fusion. Audio data and/or environment data (e.g., temperature data, precipitation data, humidity data, telemetry data, wind data, speed data, acceleration data, smell data, vibration data, etc.) can be captured at the physical scene during scanning, e.g., via one or more sensors, and can be included in the scene model. Keyframe-based methods can be used to remove redundant frames and rely on incremental 3D model reconstruction so that 3D models can become available after the first few frames of the video. Confidence estimation for stereo matching can be used for rejecting unreliable reconstructed 3D points. The 3D model of the scene can be rendered as a triangular mesh connecting reliably reconstructed 3D points and/or can be rendered as point clouds. The mesh can be texture-mapped using the acquired imagery and continuously updated. Transmission of texture-mapped 3D models can requires less bandwidth than streaming video, since the information in multiple mostly overlapping frames can be efficiently captured by a few triangles that remain unchanged as the sensor undergoes small motions.

Point clouds can be produced that are accurate and per-frame point clouds can be integrated in real time using the open-source Kinect fusion algorithms and variants to maintain an implicit representation of the visible surfaces in the form of a truncated signed distance function (TSDF), where the TSDF can be updated in real-time with each new scan or measurement and can efficiently generate the triangular meshes without artifacts. When a point cloud model or a mesh model representing a part or the entire real-world physical scene are obtained via scanning, the scene scanning and generating engine 162 places data of the point cloud model or mesh model in the virtual reality environment to match the scale of the virtual reality environment. When a point cloud model is not obtained via scanning that generates point cloud data of a real-world physical scene, the scene scanning and generation engine 162 can derive a point cloud model from a mesh model. Alternatively or in addition, the scene scanning and generation engine 162 can derive a mesh model from a point cloud model. In some embodiments, the scene scanning and generation engine 162 can derive a point cloud or mesh model from raw data if the point cloud or mesh model is not provided via scanning the real-world physical scene. For example, when 2D and/or 3D image data are obtained from one or more sensors (e.g., 2D and/or 3D cameras), the scene scanning and generation engine 162 can apply photogrammetry on the obtained image data and generate frame image data. The scene scanning and generation engine 162 can use external inputs such as GPS mapping data obtained from GPS sensors and wide geographic mapping data, and/or from manual inputs from users, to associate a scene model to a geographic location.

The object recognition and matching engine 164 can be executed to identify and match a particular real-world, physical object captured in a real-world, physical scene against defined virtual objects. For example, descriptors of the particular real-world object can be used by the object recognition and matching engine 164 to query an object library, which can return one or more virtual objects that may match of the particular real-world physical object. Since the real-world physical objects can be encountered in a real-world, physical scene, the real-world virtual objects can come from set of known equipment and generic items. One or more images of the real-world physical object can be used to retrieve 3D models from a database of computer aided design (CAD) models to aid in the identification of the real-world physical object and a corresponding virtual object.

In exemplary embodiments, the real-world physical objects can be virtualized and included in a virtual reality or augmented reality scene and the object recognition and matching engine 164 can perform an object recognition process with respect to virtual objects. As an example, the object recognition and matching engine 164 can detect virtual objects in the elements and composed scene model, and can segment the detected virtual objects into individual, separate objects. Subsequently, the object recognition and matching engine 164 can search for one or more candidate model objects corresponding to each of the segmented objects from an object library. The object recognition and matching engine 164 matches data of each of the segmented objects (e.g., point cloud data or mesh data) with data of the corresponding candidate model objects (e.g., point cloud data or mesh data) obtained from the object library and recognizes a candidate model object that is a closest match (e.g., having the greatest similarity) to features of the segmented object. An element corresponding to the segmented object can be provided with metadata for the closest match or probabilities for a set of possible matches.

The object recognition and mapping engine 164 can provide the capability to detect an instance of an object in an environment represented in the form of a point cloud and/or a triangular mesh with associated texture maps. Two types of queries can be used: objects highlighted or segmented in images or 3D meshes can be used to query an object library. Once an object has been recognized and matched to one of the objects in the library, the scanned object can be updated with a CAD model in the virtual reality and/or augmented reality environment to include a virtual object that can be manipulated by the users. After the virtual object has been updated by a CAD model, interactions between the users and the object in the virtual reality and/or augmented reality environments can be achieved because the virtual object can have functionalities such as buttons that can be pushed, covers that can be removed, dials that can be adjusted, etc.

The object recognition and matching engine 164 can include category-level detection for robustness and to quantify uncertainty of estimates. The object recognition and matching engine 164 can include a visual vocabulary of invariant descriptors extracted from an appropriate modality, 2D or 3D, without requiring any annotation. In the case of images, gradient-based feature descriptors, such as SIFT, SURF, and ORB can be applied to a database of scanned environments, either on the images, the texture maps, and/or point clouds depending on the scanning technique used, and to the query object to be detected. In case of 3D queries, Fast Point Feature Histogram (FPFH) descriptors can be used for the same purpose. The descriptors can generate a compact vector that encodes a local neighborhood around interest points. Correspondences are then sought between interest points in the scanned environment and the query. For instance, recognition, exact geometric verification in the form of a solution of the Perspective-n-Point (PnP) problem can be used for a 2D query and a 3D scene. Solving the PnP problem can result in an estimate of the pose of the camera with respect to the 3D environment when the image was acquired. For a camera with known intrinsic calibration parameters, three correspondences are sufficient. Otherwise, four or more correspondences can be required. Similarly, for a 3D query, a rigid transformation aligning the query with a part of the 3D environment can be estimated based on three correspondences.

Textureless objects, which often lack distinctive features, typically do not stand out geometrically, such as cabinets and doors, and can often suffer from the appearance of specular highlights since they are typically made of metal. To address the difficulties of detecting textureless objects, the object recognition and matching engine 164 can include a 2D to 2D template matching module to detect the most likely surfaces to contain the template in 3D before proceeding to 2D processing.

Category-level detection can enable detection instances of a given class and can allow the object recognition and matching engine 164 to find, for example, objects in a newly scanned environment by using data from similar objects as queries, reducing annotation efforts and allowing efficient scene creation from one environment to another. Category-level detection can also facilitate searches for a particular type of component in a database of scanned but not annotated scenes. After an object has been recognized, relevant metadata, such as its precise dimensions, components and available training scenarios can be associated with the corresponding recognized object.

The object recognition and matching engine 164 can associate shape and gradient-based descriptors, in addition to or instead of an appearance, with objects in a database to facilitate querying the database and to overcome differences in the appearance of similar types of objects as a result of illumination variations, specular highlights and resolution differences. Because the accuracy of scanned scenes can vary based on the technology used to scan the scenes, e.g., high-end LIDAR, RGB-D cameras or mobile device, affecting the accuracy of pose estimation, ground truth correspondences can be manually clicked on the data to facilitate assessing expected errors and uncertainty of the object recognition and matching engine 164. The object recognition and matching engine 164 can alert the user when data from a favorable viewpoint is required.

The user interface 182 can enable users to select objects of interest in images or 3D scenes to add new objects to an object library to increase the quantity of objects that can be detected by the object recognition and matching engine 164. The user interface can allow the user to select whether an "instance" level detection or a category-level detection is to be performed and the object recognition and matching engine 164 can generate a relevant detector.

By identifying and matching objects to one or more objects in the object library, the object recognition and matching engine 164 enables the system 160 to complete portions of an identified object that was not visible in data obtained from sensors so that these portions can also be manipulated by the users in the virtual reality environment 110 and/or the augmented reality environment 120. When there is insufficient data to complete the non-visible portion of the object, the object recognition and matching engine 164 can configure the non-visible portion as a grayed-out portion.

The task management engine 166 can include a set of tasks 168 which describe one or more activities and actions that can be carried out by users in the virtual reality environment 110 and/or augmented reality environment 120. The sets of tasks 168 can be defined in data structures that imparts a hierarchical structure and sequenced ordering to tasks in a given set of tasks. As one example, the data structures can include one or more graphs or trees (e.g., behavioral trees) that are used to describe the hierarchical structure and sequenced ordering of the tasks. The sets of tasks can be assigned to the users by the task management engine 166 based on one or more criteria. In exemplary embodiments, a set of tasks can represent a routine that can be performed a by user that includes any activities that a user will undertake and actions that the user will perform to complete the activities. The actions to performed by the user can require a user to speak or dictate an action to be performed, can require one or more movements by the user, and/or can require one or more interactions between the user and one or more objects. As a non-limiting example, a set of tasks can relate to a routine to be followed to repair, maintain, or assemble equipment. The first activity in the routine can be to locate a control panel. A first action for the first activity can be the user saying out loud "I am walking to the control panel" and a second action can be the user moving towards the control panel. A second activity can be to open the control panel. A first action for the second activity can be the user saying out loud "I am opening the control panel" and a second action can be the user moving towards the control panel. The routine can continue until the user completes the activities and actions associated with the given set of tasks.

The environment engine 170 can be executed to interface with the virtual reality environment and/or the augmented reality environment. As one example, the environment engine 170 can render a virtual reality scene model on the one or more displays of the virtual reality device 114 and can receive feedback from one or more of the sensors 112 in the virtual reality environment 110, which can be used to detect and track actions of the user in the virtual reality environment 110 and/or to track environmental parameters in the virtual reality environment 110. As another example, the environment engine 170 can render an augmented reality scene model on the one or more displays of the augmented reality device 124 and can receive feedback from one or more of the sensors 122 in the augmented reality environment 120, which can be used to detect and track actions of the user in the augmented reality environment 120 and/or to track environmental parameters in the augmented reality environment 120.

The event recognition engine 172 can be executed to interface with the environment engine 170 and the task management engine 166 to process the feedback from one or more of the sensors 112 in the virtual reality environment 110 and/or to process the feedback from one or more of the sensors 122 in the augmented reality environment 120. The event recognition engine 172 can use the data from the sensors 112 to recognize activities and actions being carried out by a user of the virtual reality device in the virtual reality environment and/or can use data from the sensors 122 to recognize activities and actions being carried out by a user of the augmented reality device in the augmented reality environment. To facilitate event recognition, the event recognition engine 172 can use the data from the sensors to generate an outline or skeleton on the user, capture audio outputs from the user or objects within the virtual reality environment or the augmented reality environment, and/or to capture environmental data from the scene. In some embodiments, tracking the outline or skeleton of a user can be achieved by processing depth image data to establish the positions of various skeleton joints on a human form. For example, skeleton tracking determines where a user's head, hands, and center of mass are. The outline or skeleton can be used to track a pose of the user, locations of the user, movements of the user, and/or interactions between the user and objects. Data associated with the user's outline can be collected at two scales: a small scale focused on the hands of the user and a larger scale focused on the entire body to estimate the pose of the hand and the body. The small scale capture can be acquired by sensors worn or carried by the user, e.g., gloves, depth sensors, magnetic field sensors, infrared sensors, and/or body worn cameras (such as cameras, depth sensors, infrared sensors, magnetic sensors, etc., mounted on users' heads or other parts of the user's body), while the large scale capture can be acquired by sensors disposed away from the user, e.g., stationary cameras on tripods or mounted at different locations (such as surveillance cameras). In some embodiments, markers can be attached on gloves and articles of clothing of users. In some embodiments, the raw videos can be processed with pose estimators to generate the pose of the user.

In an exemplary embodiment, a user of the virtual reality device 114 in the virtual reality environment 110 and/or a user of the augmented reality device 124 in the augmented reality environment 120 can be assigned the set of tasks 168 to be complete by the task management engine 166. As one example, a user of the virtual reality device 114 in the virtual reality environment 110 can be assigned a set of tasks to repair, maintain, or assemble equipment. The user can perform activities and actions in the set of tasks to simulate repairing, maintaining, or assembling a virtual object corresponding to the equipment in the virtual reality environment 110 and the event recognition engine can be trained to detect the activities and actions performed by the user in the virtual reality environment 110 based on output data from the sensors 112. As another example, a user of the augmented reality device 124 in the augmented reality environment 120 can be assigned a set of tasks to repair, maintain, or assemble equipment. The user can perform activities and actions in the set of tasks to actual repair, maintain, or assemble the actual equipment in the augmented reality environment 120 and the event recognition engine 172 can detect the activities and actions performed by the user in the augmented reality environment 120 based on out data from the sensors 112. In some embodiments, the system 160 can superimpose the virtual objects corresponding to the equipment over the actual equipment such that when the user interacts with the actual equipment, the user also interacts with the virtual object.

The error detection and correction engine 174 can interface with the event recognition engine 172 and the task management engine 166 to detect and correct errors corresponding to deviations from the activities and actions for the set of tasks assigned to the user and being performed by the user in the virtual reality environment and/or the augmented reality environment. While the error detection and correction engine 174 is illustrated as being separate from the event recognition engine 172, in exemplary embodiments, the error detection and correction engine 174 can be a subsystem of the event recognition engine 172. Additionally, the event recognition engine 172 can be programmed to detect events in conjunction with the error detection and correction engine 174 using the trained machine learning models described herein. The error detection and correction engine 174 can use trained machine learning models 176 and/or 178 to detect the errors corresponding to deviations from the activities and actions of the assigned set of tasks being performed by the user. As described herein, the trained machine learning models 176 and/or 178 can be trained and validated based on training data and test data generated in response to users of the virtual reality device in the virtual reality environment simulating the performance of the set of tasks in the virtual reality environment using virtual objects. Once the machine learning models 176 and/or 178 have been trained and validated, the error detection and correction engine 174 can be programmed to detect and/or correct errors corresponding to deviations of users of the augmented reality device in the augmented reality environment while actually performing activities and actions associated with the set of tasks on actual real-world physical objects.

The immersion engine 180 can interface with the environment engine to record user movements, user interactions with objects, user location, user poses, audio output, and annotations, and can synchronize audio outputs recorded during a virtual reality session of a user in the virtual reality environment and/or during a augmented reality session of a user in the augmented reality environment with the user movements, user interactions with objects, user location, user poses, and annotations. This recorded and synchronized data can be used to facilitate synchronous communications between the virtual reality environment and the augmented reality environment, facilitate subsequent playback of a recorded virtual reality session and/or a recorded augmented reality session, and/or facilitate training of the machine learning algorithms.

Figure 6:
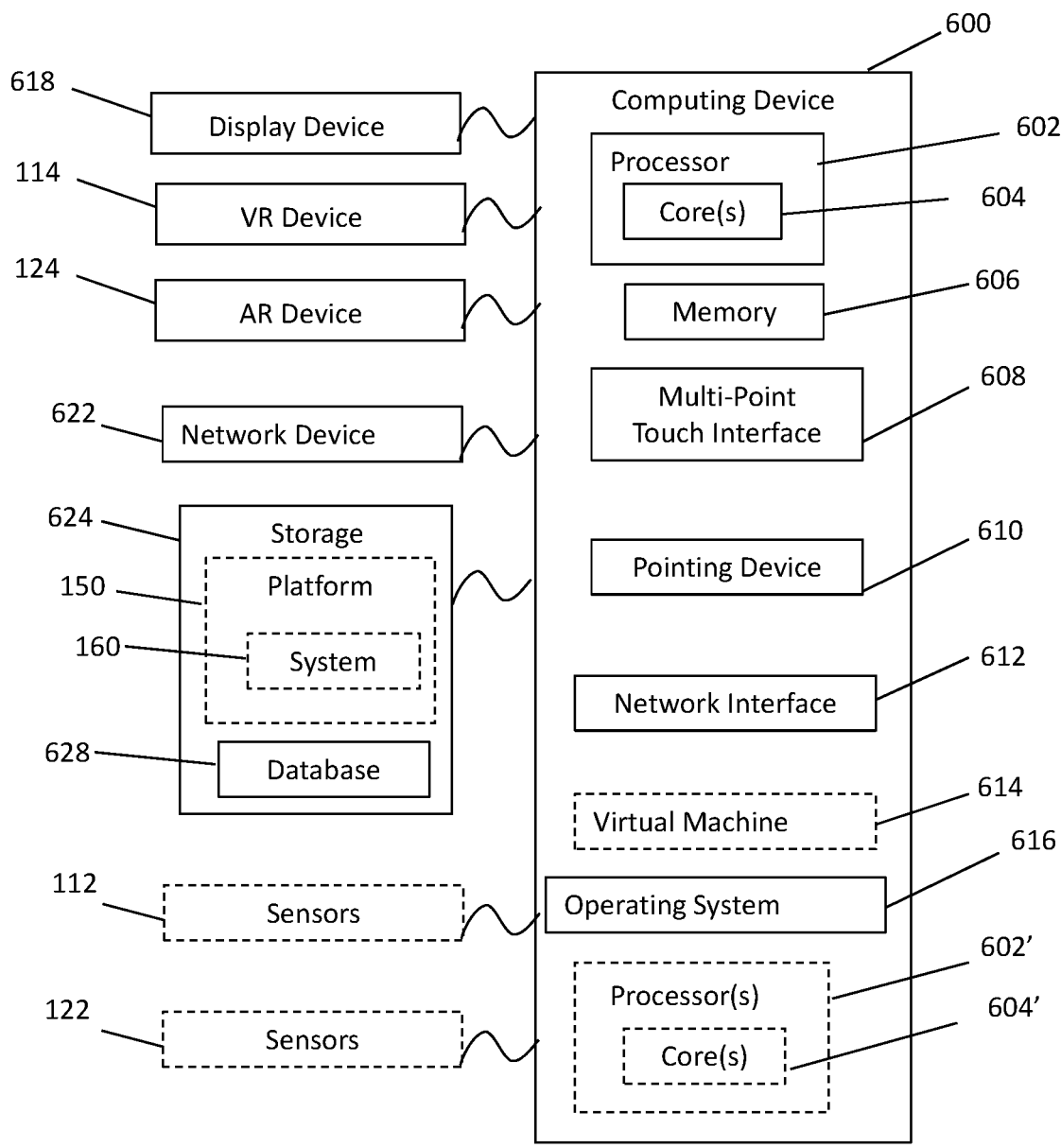
FIG. 6 is a block diagram of an exemplary computing device configured to interface with and/or implement a system for training one or more machine learning models and/or employing the one or more trained machine learning models to detect and/or correct user errors in accordance with embodiments of the present disclosure.

The user interface 182 can be programmed and/or configured to provide one or more graphical user interfaces (GUIs) through which users can interact with the system 160. The GUIs can be rendered on the display devices and can include data output areas to display information to the users output by the system as well as data entry areas to receive information from the users as inputs to the system 160. For example, data output areas of the GUIs can output information associated with, for example, one or more objects in the environment and/or activities and actions to performed to the users via the data outputs and the data entry areas of the GUIs can receive, for example, information associated with, for example, one or more objects in the environment and/or activities and actions being performed by the users. Some examples of data output areas can include, but are not limited to text, graphics (e.g., graphs, maps, images, and the like), and/or any other suitable data output areas. Some examples of data entry fields can include, but are not limited to text boxes, check boxes, buttons, dropdown menus, and/or any other suitable data entry fields. In exemplary embodiments, the GUIs can be accessed via the virtual reality device 114, the augmented reality device 124, a computing device in the virtual reality environment 110, a computing device in the augmented reality environment 120, and/or a computing device disposed remotely from the virtual reality environment 110 and the augmented reality environment 120. An example computing device is shown in FIG. 6. In some embodiments, the user interface accessed through a web/desktop interface.

Figure 2:
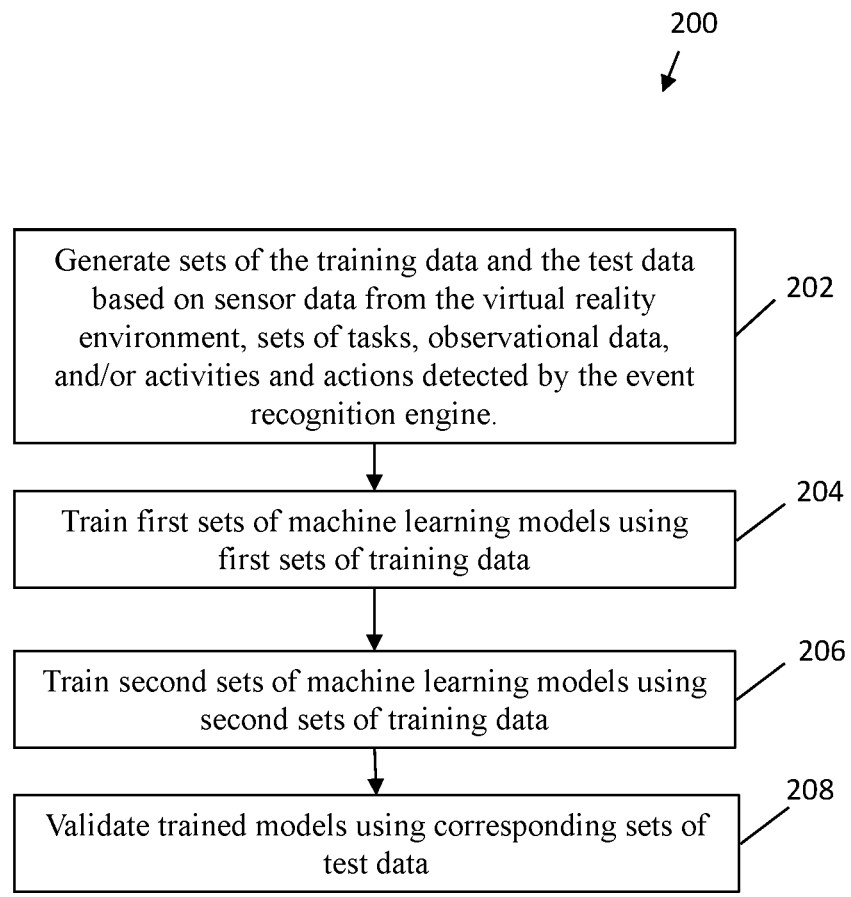
FIG. 2 is a flowchart of an example process for training one or more machine learning models to detect and/or correct user errors in accordance with embodiments of the present disclosure.

With reference to FIGS. 1 and 2, the one or more machine learning models utilized by error detection and/or correction engine 174 can be trained using an example training process 200 shown in FIG. 2. As step 202, the system 100 can be executed to generate sets of training data 184 and 186, and sets of test data 188 and 190 based on sensor data from the sensors 112 in the virtual reality environment 110, the sets of tasks 168, observational data, and/or activities and actions detected by the event recognition engine 172. For example, virtual reality sessions can be initiated in the virtual reality environment and the system 160 via the environment engine 170 can render a virtual reality scene model on the one or more displays of the virtual reality device 114 for each session. The users can be assigned sets of tasks in the sessions to be simulated by the users and the users can simulate performance of the sets of tasks by interacting with virtual objects.

The system 160 can track audible outputs from the users, movements of the users, locations of the users, poses of the users, interactions between the users and virtual objects, and/or environment information in the virtual reality environment on a session-by-session basis to generate a corpus of data. In some instances, the users can simulate performance of the activities and actions associated with the assigned sets of tasks accurately, complete, and without deviations from the specified ordered sequence (e.g., without error) and in some instances the users can simulate performance of the activities and actions associated with the assigned sets of tasks and purposely or otherwise incorrectly, incompletely, and/or with deviations in the specified ordered sequence (e.g., with errors). The data collected from the virtual reality sessions can be parsed to separate the audio data in the virtual reality sessions, the observation data corresponding to the audio data, and the recognized events corresponding to the audio outputs from the other data in the virtual reality sessions while maintaining a correlation between the audio data and observational data and the recognized events related to the audio data and observational data to maintain a sequence of activities and actions that occurred during the sessions. The audio data and associated observational data (e.g., a corpus of audio related data and associated metadata) are then divided by sessions into the set of training data 184 and the set of test data 188, where the set of training data 184 and the set of test data 188 are mutually exclusive from each other such that there is no overlap between the set of training data 184 and a corresponding set of test data 188. The remaining data collected from the virtual reality sessions (e.g., movements of the users, locations of the users, poses of the users, interactions between the users and virtual objects, environment information, associated observational data, and/or associated recognized events output by the event recognition engine forming a corpus of physical data and associated metadata) can be divided by sessions into a set of training data 186 and a set of test data 190, where the set of training data 188 and the set of test data 190 are mutually exclusive from each other such that there is no overlap between the set of training data 186 and a corresponding set of test data 190.

At step 204, the set of training data 184 can be input to a machine learning algorithm 192 to train sets of machine learning models 176 based on processing the sets of training data 184, and at step 206, the set of training data 188 can be input to a machine learning algorithm 194 to train sets of machine learning models 178 based on processing the sets of training data 186. Continuing with the example with respect to the training and testing data for virtual reality sessions, different machine learning models can be generated for the training data such that, for example, the sets of training data 184 that correspond to data associated with audible outputs from the user of the virtual reality device 114 during a sessions can be processed by the machine learning algorithm 192 and the sets of training data 186 corresponding to movements of the users of the virtual reality device 114 and interactions between the users of the virtual reality devices 114 and the virtual objects can be processed by the machine learning algorithm 194 to generate the machine learning models 176.

The sets of training data 184 and 186 can be input to the machine learning algorithms 192 and 194, respectively, to iteratively train the machine learning models 176 and 178, respectively, to determine whether the users in a session incorrectly, incompletely performed one or more activities or actions, and/or whether the user deviated from an expected ordered sequence of activities and actions associated with a set of tasks. By processing the sets of training data 184 and 186, the models 176 and 178 can be trained to determine probability distributions that a user's activities and actions match the expected activities and actions in a set of tasks and/or that the activities and actions did not deviate from the ordered sequence specified by the set of tasks. At step 208, the trained models 176 and 178 can be validated using the corresponding sets of test data 188 and 190, respectively.

In exemplary embodiments, the platform 150 can generate different machine learning models for each of the sets of tasks 168, for each activity in each of the sets of tasks 168, and/or for each of the actions in each of the sets of tasks 168. The system 160 can load the appropriate machine learning models for a particular set of tasks upon assignment of the set of tasks to a user. For example, a machine learning model for the audio events and a machine learning model for the physical events can be loaded for the assigned set of tasks, a set of machine learning models can be loaded for each activity defined by the assigned set of tasks (e.g., a different set of machine learning models can be specified for each activity), and/or a set of machine learning models can loaded for each action defined by the assigned set of tasks (e.g., a different set of machine learning models can be specified for each action).

As non-limiting example, in one embodiment, the machine learning algorithms 192 and 194 can be deep neural network machine learning algorithms. Embodiments of the deep neural network machine learning algorithm can use, for example, Long Short Term Memory (LSTM) layers.

In some embodiments, the machine learning algorithms 192 and 194 can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms Examples of supervised learning algorithms can include, for example, AODE; Artificial neural network, such as Backpropagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

Figure 3A:
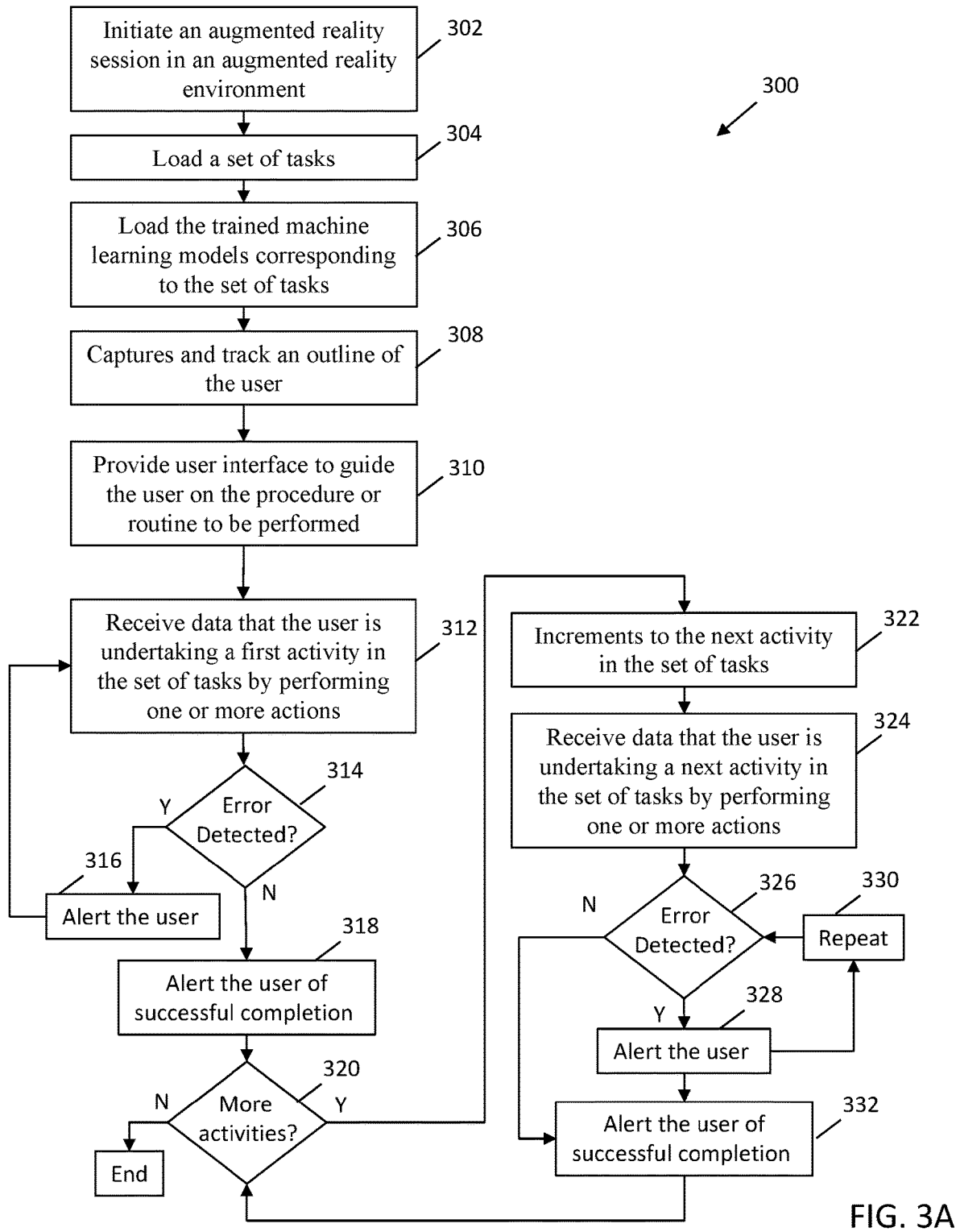
FIGS. 3A-B are flowcharts of example processes for employing one or more trained machine learning models to detect and/or correct user errors in accordance with embodiments of the present disclosure.

With reference to FIGS. 1 and 3A, using the trained and validated models 176 and 178, the system 160 can execute an example process 300 shown in FIG. 3A to detect and correct errors in the augmented reality environment 120. At step 302, an augmented reality session can be initiated in the augmented reality environment to render an augmented reality scene model on the one or more displays of the augmented reality device 124. The augmented reality scene model can correspond to the real-world physical scene within which the user of the augmented reality device 124 is located. The user can be tasked with performing one or more routines or procedures in the real-world physical scene. At step 304, the system 160 can load a set of tasks corresponding to the procedure or routine to be performed by the user into the environment engine 170, and at step 306, the system can load the trained machine learning models 176 and/or 178 corresponding to the set of tasks into the error detection engine 174. At step 308, the system captures and tracks an outline or skeleton of the user via the one or more sensors 122 in the augmented reality environment.

In some embodiments, the error detection engine 172 can execute a combination of the machine learning models 176 and 178 in sequence and/or concurrently with one another for detecting errors associated with performance of the set of tasks. As one example, the engine 172 can execute two or more machine learning models 176 and 178 concurrently with one another such that each of the machine learning models 176 and 178 being executed generates an output based on the actions being performed. The engine can weight the outputs of the machine learning models such that the outputs of one or more of the machine learning models 176 and 178 can be prioritized or ranked and may be combined to arrive at a determine that an error has been detected. The engine 172 can use a voting model in which the outputs of each of the machine learning model 176 and 178 can count as a vote and the output with the most votes can be chosen by the engine to determine whether an error has been detected. In some embodiments, the weighting employed by the engine 172 can give different numbers of votes to different machine learning models. In some embodiments, the engine 172 can dynamically adjust the weighting and/or voting model.

At step 310, a user interface can be rendered on the one or more displays of the augmented reality device 124 and/or can include one or more audio outputs (e.g., verbal instructions) output via one or more speakers to guide the user on the procedure or routine to be performed in the real-world physical scene. The procedure or routine defined by the set of tasks can include one or more activities and actions to be performed by the user, where the action to by performed by the user can include a user speaking or dictating an physical action to be performed, can include one or more movements by the user, and/or can include one or more interactions between the user and one or more virtual and/or actual objects. The set of tasks can also include one or more conditional events, where performance of one or more of the activities and/or actions can be conditioned on one or more conditional events occurring. For example, before a user can perform one or more actions of an activity, a condition of a conditional event must be satisfied. As a non-limiting example, a set of tasks can relate to a routine to be followed to repair, maintain, or assemble equipment. At step 312, the system received data from the augmented reality environment indicating that the user is undertaking a first activity in the set of tasks by performing one or more actions, and at step 314, the event recognition engine identifies the actions and the error detection engine uses the trained machine learning models to determine whether the one or more action are correct and are occurring at the correct time in the routine based on the order sequence defined by the set of tasks. As an example, the first activity in the routine can be to locate a control panel. A first action for the activity can include the user saying out loud "I am opening the control panel" and a second action can include the user opening the actual control panel, where performance of the action to open the control panel can be conditioned on a conditional event of the user holding a screwdriver such that if the user is not holding a screw driver the control panel cannot be opened. If the error detection engine determines that the user of the augmented reality device 124 deviated or is deviating from the actions to be performed for the first activity, as defined by the set of tasks, at step 316, the error detection engine can cause the augment reality device 124 or another device located at the real-world physical location to alert the user of the error and/or provide the user with feedback to correct the error via the augment reality device 124 or the other device, and the process returns to step 312. If the actions for the first activity are performed correctly, at step 318, the error detection engine can provide feedback to the user via the augmented reality device or the other that first activity was successfully completed, after which, the process can continue at step 320.

At step 320, the system determines whether or not there are more activities to be performed for the set of tasks. If not, the process 300 ends. If there are more activities, the system increments to the next activity in the set of tasks at step 322 and at step 324, the system receive data indicating that the user is undertaking the next activity in the set of tasks by performing one or more actions associated with the next activity, and at step 326, the event recognition engine identifies the actions and the error detection engine uses the trained machine learning models to determine whether the one or more action are correct and are occurring at the correct time in the routine based on the order sequence defined by the set of tasks. As an example, the activity can be to disconnecting a main power supply. A first action for the activity can include the user saying out loud "I am disconnecting the main power supply" and a second action can include the user flipping an actual switch in the actual control panel. If the error detection engine determines that the user of the augmented reality device 124 deviated or is deviating from the actions to be performed for the activity, as defined by the set of tasks, at step 328, the error detection engine can cause the augmented reality device 124 or another device located at the real-world physical location to alert the user of the error and/or provide the user with feedback to correct the error via the augmented reality device 124 or the other device, and at step 330, the user repeats one or more of the actions, after which the process returns to step 326. If the actions for the activity are performed correctly, at step 332, the error detection engine can provide feedback to the user via the augmented reality device or the other device that first activity was successfully completed, after which, the process can continue at step 320. The process can continue until each of the activities and associated actions in the set of tasks have been performed correctly in the sequenced order.

Figure 3B:
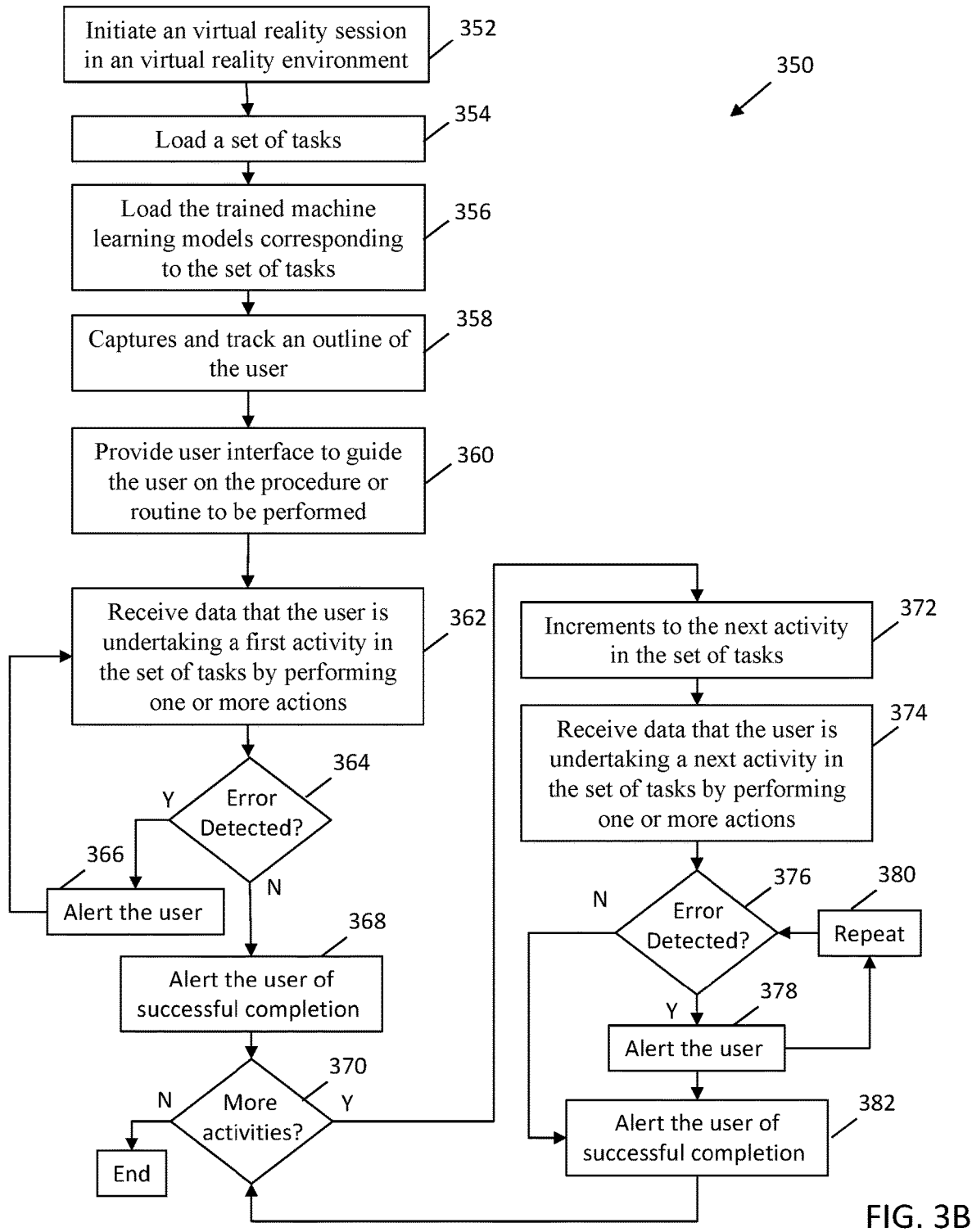

With reference to FIGS. 1 and 3B, using the trained and validated models 176 and 178, the system 160 can execute an example process 350 shown in FIG. 3B to detect and correct errors in the virtual reality environment 110. At step 352, a virtual reality session can be initiated in the virtual reality environment to render a virtual reality scene model on the one or more displays of the virtual reality device 114. The virtual reality scene model can be virtual 3D representation of a real-world location. The user can be tasked with performing one or more routines or procedures in the virtual reality scene model scene. At step 354, the system 160 can load a set of tasks corresponding to the procedure or routine to be performed by the user into the environment engine 170, and at step 356, the system can load the trained machine learning models 176 and/or 178 corresponding to the set of tasks into the error detection engine 174. At step 358, the system captures and tracks an outline or skeleton of the user via the one or more sensors 122 in the virtual reality environment.

In some embodiments, the error detection engine 172 can execute a combination of the machine learning models 176 and 178 in sequence and/or concurrently with one another for detecting errors associated with performance of the set of tasks. As one example, the engine 172 can execute two or more machine learning models 176 and 178 concurrently with one another such that each of the machine learning models 176 and 178 being executed generates an output based on the actions being performed. The engine can assign weights to the outputs of the machine learning models such that the outputs of one or more of the machine learning models 176 and 178 can be prioritized or ranked and may be combined to arrive at a determine that an error has been detected. The engine 172 can use a voting model in which the outputs of each of the machine learning model 176 and 178 can count as a vote and the output with the most votes can be chosen by the engine to determine whether an error has been detected. In some embodiments, the weighting employed by the engine 172 can give different numbers of votes to different machine learning models. In some embodiments, the engine 172 can dynamically adjust the weighting and/or voting model.

At step 360, a user interface can be rendered on the one or more displays of the virtual reality device 114 and/or can include one or more audio outputs (e.g., verbal instructions) output via one or more speakers to guide the user on the procedure or routine to be performed in the virtual reality scene model. The procedure or routine defined by the set of tasks can include one or more activities and actions to be performed by the user, where the action to by performed by the user can include a user speaking or dictating an physical action to be performed, can include one or more movements by the user, and/or can include one or more interactions between the user and one or more virtual objects. The set of tasks can also include one or more conditional events, where performance of one or more of the activities and/or actions can be conditioned on one or more conditional events occurring. For example, before a user can perform one or more actions of an activity, a condition of a conditional event must be satisfied. As a non-limiting example, a set of tasks can relate to a routine to be followed to simulate a repair, maintenance, or assemble of equipment. At step 362, the system received data from the virtual reality environment indicating that the user is undertaking a first activity in the set of tasks by performing one or more actions, and at step 364, the event recognition engine identifies the actions and the error detection engine uses the trained machine learning models to determine whether the one or more action are correct and are occurring at the correct time in the routine based on the order sequence defined by the set of tasks. As an example, the first activity in the routine can be to locate a virtual object representing a control panel. A first action for the activity can include the user saying out loud "I am opening the control panel" and a second action can include the user opening the virtual control panel, where performance of the action to open the virtual control panel can be conditioned on a conditional event of the user holding a virtual or actual screwdriver such that if the user is not holding the virtual or actual screwdriver, the virtual control panel cannot be opened. If the error detection engine determines that the user of the virtual reality device 114 deviated or is deviating from the actions to be performed for the first activity, as defined by the set of tasks, at step 366, the error detection engine can cause the virtual reality device 114 or another device in the virtual reality environment to alert the user of the error and/or provide the user with feedback to correct the error via the virtual reality device 114 or the other device, and the process returns to step 362. If the actions for the first activity are performed correctly, at step 368, the error detection engine can provide feedback to the user via the virtual reality device or the other device that first activity was successfully completed, after which, the process can continue at step 370.

At step 370, the system determines whether or not there are more activities to be performed for the set of tasks. If not, the process 350 ends. If there are more activities, the system increments to the next activity in the set of tasks at step 372 and at step 374, the system receive data indicating that the user is undertaking the next activity in the set of tasks by performing one or more actions associated with the next activity, and at step 376, the event recognition engine identifies the actions and the error detection engine uses the trained machine learning models to determine whether the one or more action are correct and are occurring at the correct time in the routine based on the order sequence defined by the set of tasks. As an example, the activity can be to simulate disconnecting a main power supply. A first action for the activity can include the user saying out loud "I am disconnecting the main power supply" and a second action can include the user flipping a virtual switch in the virtual control panel. If the error detection engine determines that the user of the virtual reality device 114 deviated or is deviating from the actions to be performed for the activity, as defined by the set of tasks, at step 378, the error detection engine can cause the virtual reality device 114 or another device located in the virtual reality environment to alert the user of the error and/or provide the user with feedback to correct the error via the virtual reality device 114 or the other device, and at step 380, the user repeats one or more of the actions, after which the process returns to step 376. If the actions for the activity are performed correctly, at step 382, the error detection engine can provide feedback to the user via the virtual reality device or the other device that first activity was successfully completed, after which, the process can continue at step 370. The process can continue until each of the activities and associated actions in the set of tasks have been performed correctly in the sequenced order.

Figure 4:
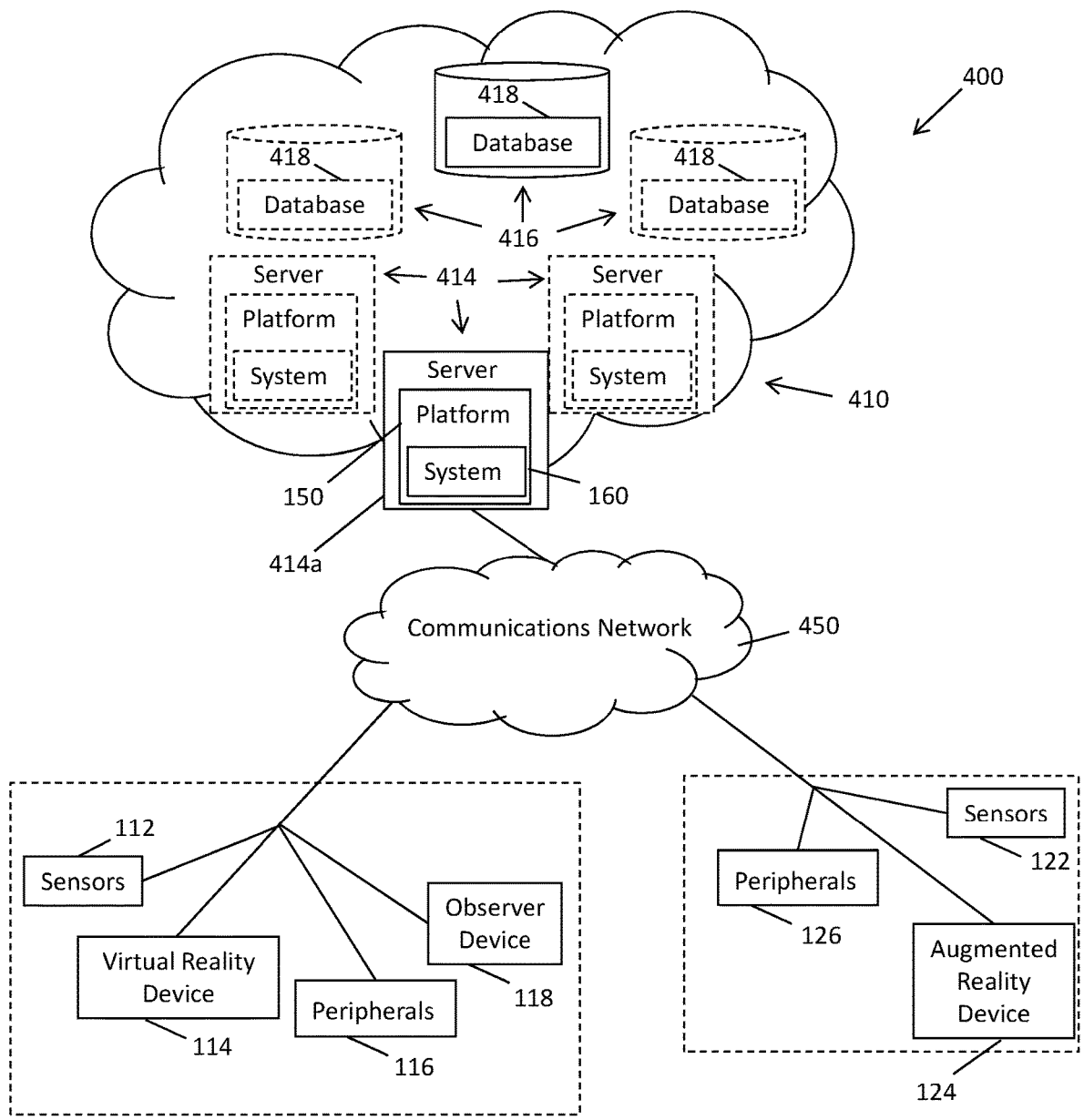
FIG. 4 is an exemplary computer environment for implementing an environment for training and employing one or more machine learning models to detect and/or correct user errors in accordance with embodiments of the present disclosure.

FIG. 4 is an exemplary computer environment for implementing an environment for training and employing one or more machine learning models to detect and/or correct user errors in accordance with embodiments of the present disclosure. As shown in FIG. 4, the environment 400 can include distributed computing system 410 including shared computer resources, such as servers 414 and (durable) data storage devices 416, which can be operatively coupled to each other. For example, two or more of the shared computer resources can be directly connected to each other or can be connected to each other through one or more other network devices, such as switches, routers, hubs, and the like. Each of the servers 414 can include at least one processing device and each of the data storage devices 416 can include non-volatile memory for storing databases 418. The databases 418 can store data including, for example, sets of tasks, object libraries, machine learning algorithms, trained machine learning models, virtual reality scene models, augmented reality scene models, virtual reality session data, augmented reality session data, and the like.

Any one of the servers 414 can implement instances of the platform 150, system 160 and/or the components thereof. In some embodiments, one or more of the servers 414 can be a dedicated computer resource for implementing the platform 150, system 160 and/or components thereof. In some embodiments, one or more of the servers 414 can be dynamically grouped to collectively implement embodiments of the platform 150, system 160 and/or components thereof. In some embodiments, one or more servers 414 can dynamically implement different instances of the platform 150, system 160 and/or components thereof.

The distributed computing system 410 can facilitate a multi-user, multi-tenant environment that can be accessed concurrently and/or asynchronously by users. For example, the virtual reality device 114 and the augmented reality device 124 can be operatively coupled to one or more of the servers 414 and/or the data storage devices 416 via a communication network 450, which can be the Internet, a wide area network (WAN), local area network (LAN), and/or other suitable communication network.

In exemplary embodiments, the virtual reality device 114 and/or augmented reality device 124 can initiate communication with the distributed computing system 410 to establish a virtual reality session and an augmented reality session, respectively, with the distributed computing system 410 that allows each of the virtual reality device 114 and the augment reality device 124 to utilize the platform 150, system 160, and/or components thereof as described herein. As an example, in response to the virtual reality device 114 communicating with the distributed computing system 410, the server 414a can launch an instance of the system 160, which can interact with the devices in the virtual reality environment as described herein. As an example, in response to the augmented reality device 124 communicating with the distributed computing system 410, the server 414a can launch an instance of the system 160, which can interact with the devices in the augmented reality environment as described herein.

Figure 5:
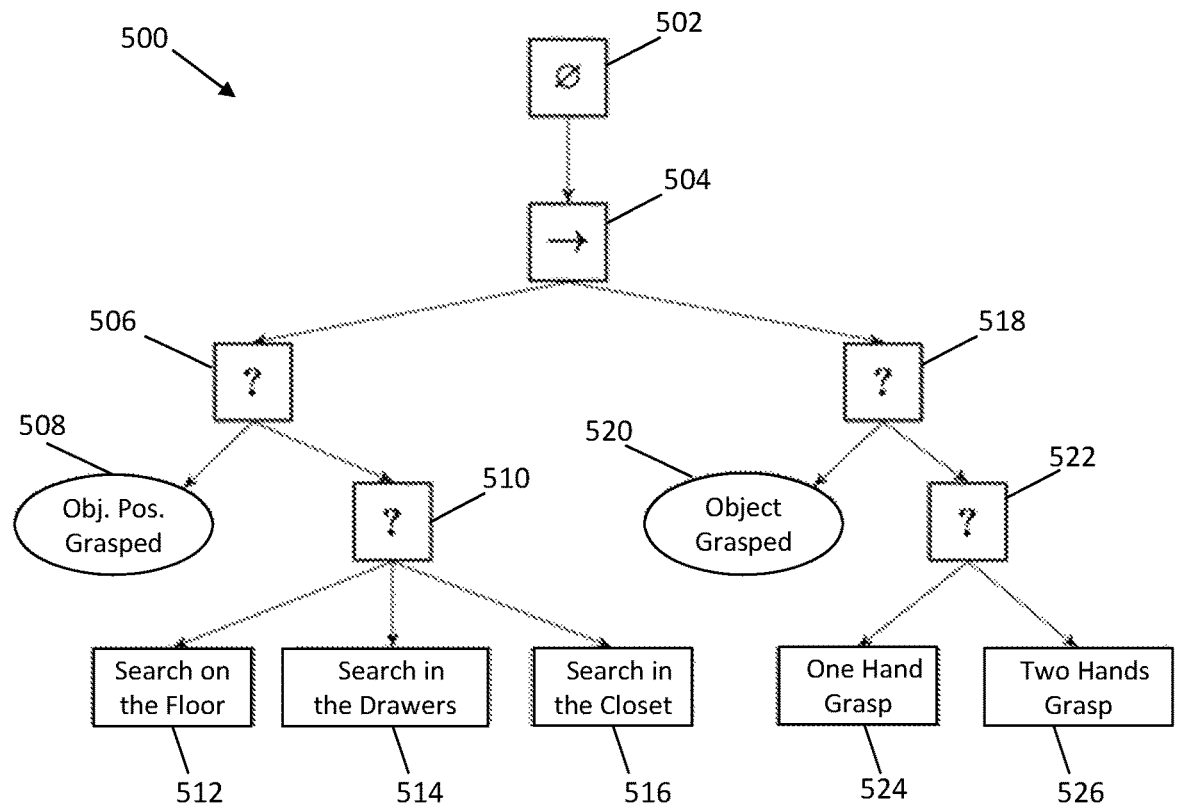
FIG. 5 is an exemplary behavior tree structure that defines a hierarchical structure and sequenced order for a set of tasks.

In some embodiments, the sensors 112, virtual reality device 114, and peripherals 116 can be in communication with a computing device in the virtual reality environment and the computing device can be in communication with the one or more servers 414. Additionally, while the system 160 is depicted as being executed by the one or more servers 414 in FIG. 4, in exemplary embodiments of the server, the system 160 can be executed on the computing device in the virtual reality environment or the virtual reality device 114. Similarly, in some embodiments, the sensors 122, augmented reality device 124, and peripherals 126 can be in communication with a computing device in the augmented reality environment and the computing device can be in communication with the one or more servers 414. Additionally, while the system 160 is depicted as being executed by the one or more servers 414 in FIG. 4, in exemplary embodiments of the server, the system 160 can be executed on the computing device in the virtual reality environment 110 or the augmented reality environment 120 or can be executed by the virtual reality device 114 and/or the augmented reality device 124. In some embodiments, the system 160 or components thereof can be installed on the virtual reality device 114 and/or the augmented reality device 124 to allow the devices 114 and/or 124 to operate in a stand-alone and/or "offline" mode. For embodiments in which the devices 114 and/or 124 operate in an offline mode, the devices 114 can be connected to the communication network after a session and can transmit data/information collected during the session to the server(s) 414 and/or can be directly connected to a computing device to transfer the data/information to the computing device FIG. 5 is a graphical representation of an exemplary non-limiting behavior tree structure that can define a hierarchical structure and sequenced order for a set of tasks. As a non-limiting example, the behavior tree can be defined using Panda Behaviour Tree Scripting for Unity. The behavior tree represents a plan-execution model composed of a hierarchy of actions/behaviors and provides predictable execution sequences. In each execution tick, the tree is traversed from a root node 502 in depth-first order, where the execution order of the nodes is implicitly expressed by the tree structure. Execution ticks can continue at a set frequency until the root node 502 is returned with a success/failure status. After a node of the tree is executed, the node returns a status (e.g., running, succeeded, failed). The data structure corresponding to the behavior tree can represent a prescribed/acceptable/desirable/permissible activities, where an activity can be composed of sub-activities, and at the end are composed of (granular-enough) individual actions. The system continuously monitors and determines if the user performs a known action. (among a set of known and recognizable actions as determined by the event recognition engine and the error detection engine). The system can track and record recognized user's actions and can log the progress of the user throughout the activities. If at any point in time throughout the progress of a given action is detected that would render the execution of the tree overall to output a failed state, the system assesses the performance of the user recognized action as a "fail". Otherwise, the recognized action can be considered a "pass".

As shown in the non-limiting example of the in FIG. 5, in a level below the root node 502, the tree can include a node 504. The node 504 can be a sequence node which functions to run its children nodes in sequence through hierarchy. The sequence node 504 succeeds when all of its children nodes succeeds and fails if/when the first one of the children nodes fail. Below the sequence node 504, the tree can selector of fallback nodes 506, 510, 518, and 522. The fallback nodes 506 and 518 function to run its children nodes one at a time, where the selector nodes 506 and 518 succeed when a first one of the children nodes succeeds and fails if all the children nodes fail. The nodes 508 and 520 can be conditional nodes that correspond to conditional events to be satisfied before certain actions occur. For example, satisfaction of a condition specified by node 508 can be required before the actions associated with nodes 512, 514, and 516 can be performed, where performance of the actions associated with nodes 512, 514, and/or 516 before the conditional event of node 508 is satisfied can result in a failure. The nodes 512, 514, 516, 524, and 526 can represent leaf nodes in the behavior tree structure and can include actions to be performed by users for one of more activities in the behavior tree structure. After their execution, the status of the leaf nodes can be used to determine whether one or more nodes that are higher in hierarchy than the leaf nodes succeed or fail depending on whether the nodes that are higher in the hierarchy are sequence nodes or fallback nodes.

FIG. 6 is a block diagram of an exemplary computing device 600 configured to interface with and/or implement a system for training one or more machine learning models and/or employing the one or more trained machine learning models to detect and/or correct user errors in accordance with embodiments of the present disclosure. Embodiments of the computing device 600 can be used as servers (e.g., the server 414), computing devices in the virtual reality and augmented reality environments, and/or an augmented reality device (e.g., the augmented reality device 124). The computing device 600 can include one or more non-transitory computer-readable media for storing one or more computer-executable instructions or software for implementing exemplary embodiments, such as the platform 150, system 160, and/or components thereof. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device may store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing instances of computer-readable and computer-executable instructions or software stored in the memory 606 and other programs for controlling system hardware. For example, the processor(s) 602, 602' can execute the platform 150, system 160, and/or components thereof to train one or more machine learning models and/or employ the one or more trained machine learning models to detect and/or correct user errors. Processor 602 and processor(s) 602' may each be a single core processor or multiple core (604 and 604') processor and may be central processing units, graphical processing units, and the like.

Virtualization may be employed in the computing device so that infrastructure and resources in the computing device may be shared dynamically. A virtual machine 614 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a display device 618, an embodiment of the virtual reality device 114 and/or an embodiment of the augmented reality device 124 in accordance with exemplary embodiments. The computing device 600 may include other I/O devices for receiving input from a user, for example, a keyboard or any suitable multi-point touch interface 608, a pointing device 610 (e.g., a mouse or joystick). The computing device 600 can include the sensors 112 for embodiments in which the computing device 600 is in the virtual reality environment 110 and can include the sensors 122 for embodiments in which the computing device 600 is in the augmented reality environment 120 as described herein. The computing system 600 may include other suitable conventional I/O peripherals.

The computing device 600 may also include one or more storage devices 624, such as a hard-drive, CD-ROM, or other computer readable media, for storing data and computer-readable instructions and/or software, such as the platform 150, system 160, and/or components thereof. Exemplary storage device 624 may also store one or more databases for storing any suitable information required to implement exemplary embodiments. For example, exemplary storage device 624 can store one or more databases 628 for storing information/data including sets of tasks, object libraries, machine learning algorithms, trained machine learning models, virtual reality scene models, augmented reality scene models, virtual reality session data, augmented reality session data, and the like. The databases may be updated at any suitable time to add, delete, and/or update one or more items in the databases.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, a head mount device, handheld computer, tablet computer (e.g., the iPad™ tablet computer), mobile computing or communication device (e.g., the iPhone™ communication device), Hololens from Microsoft®, or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, Microsoft® Xbox operating systems for Xbox gaming systems, Playstation operating systems for PlayStation gaming systems, Wii operating systems for Nintendo® Wii gaming systems, Switch operating system for Nintendo® Switch gaming systems, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 7:
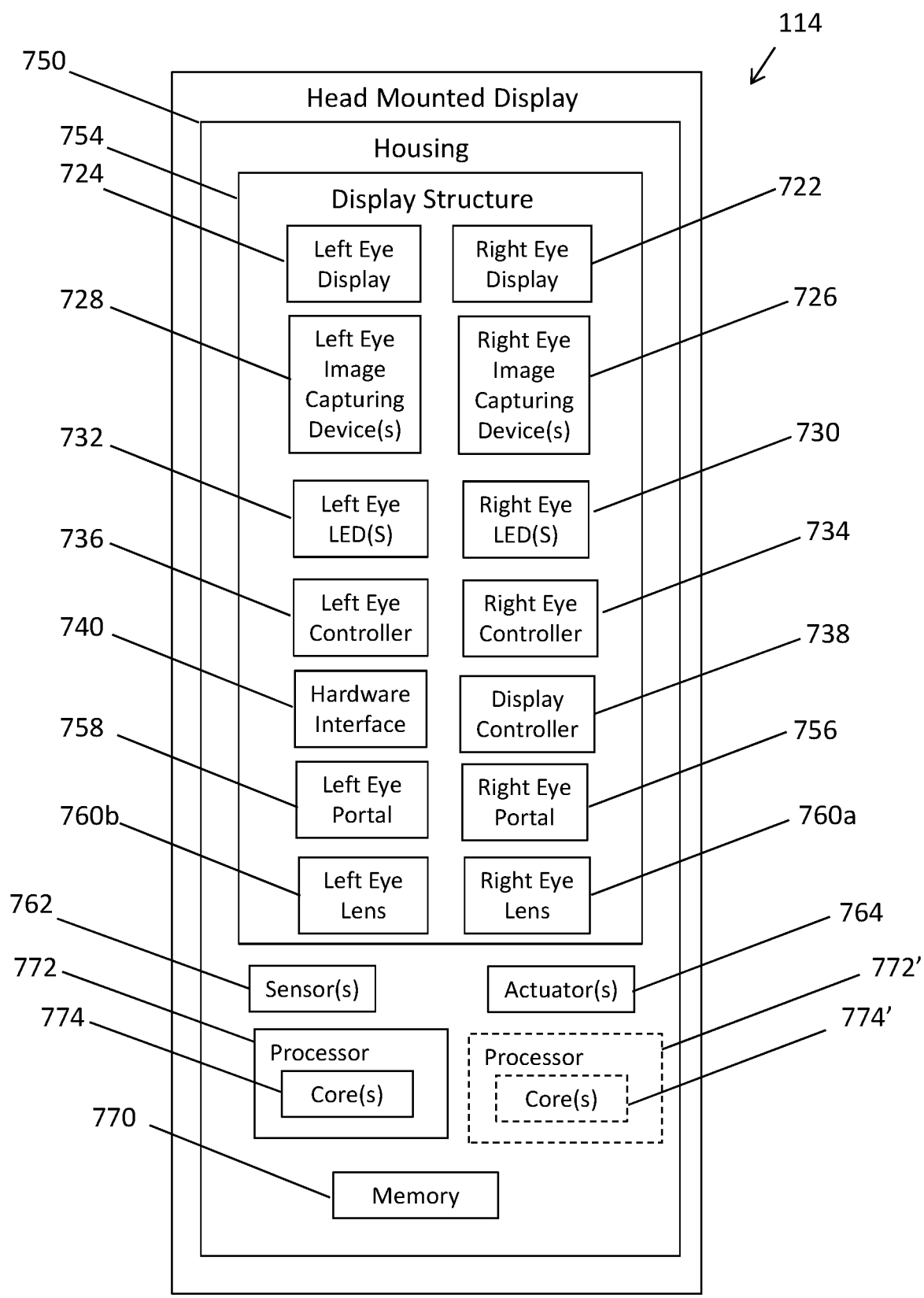
FIG. 7 is an exemplary head mounted display device in accordance with embodiments of the present disclosure.

FIG. 7 is an exemplary embodiment of the virtual reality device 114 in accordance with embodiments of the present disclosure. The virtual reality device 114 can be a head mounted display that includes circuitry disposed within a housing 750. The circuitry can include a right eye display 722, a left eye display 724, one or more right eye image capturing devices 726, one or more left eye image capturing devices 728, one or more right eye light emitting diodes 730, one or more left eye light emitting diodes 732, a right eye controller 734, a left eye controller 736, one or more display controllers 738, one or more hardware interfaces 740, one or more sensors 762 that can include, for example, outward facing cameras, depth sensors, magnetic sensors, infrared sensors, motion sensors, inertial sensors (e.g., accelerometers, gyroscopes), one or more environmental sensors, and/or any other sensors suitable for detecting and sense information in the virtual reality environment 110 (e.g., sensors 112). The virtual reality device 114 can also include one or more actuators 764 to provide guidance and feedback to the user. For example, the actuators 764 can include speakers, piezoelectric devices (for haptic feedback), illumination device (such as light emitting diodes), and/or any other suitable devices for providing guidance and/or feedback to the user.

The right and left eye displays 722 and 724 can be disposed within the housing 750 such that the right eye display 722 is positioned in front of the right eye of the user when the housing 750 is mounted on the user's head and the left eye display 724 is positioned in front of the left eye of the user when the housing 750 is mounted on the user's head. In this configuration, the right eye display 722 and the left eye display 724 can be controlled by the one or more display controllers 738 to render images of a virtual reality scene model on the right and left eye displays 722 and 724 to induce a stereoscopic effect, which can be used to generate three-dimensional virtual reality scene, where virtual objects in the in the virtual reality scene can be perceived by the user's vision system as being at different depths. In exemplary embodiments, the right eye display 722 and/or the left eye display 724 can be implemented as a light emitting diode display, an organic light emitting diode (OLED) display (e.g., passive-matrix (PMOLED) display, active-matrix (AMOLED) display), and/or any suitable display.

The one or more right eye image capturing devices 726 can be disposed in the housing 750 relative to the right eye display 722 so that the one or more right eye image capturing devices 726 can be positioned and oriented to capture images of the user's right eye as the user views the right eye display 722. Likewise, the one or more left eye image capturing devices 728 can be disposed in the housing 750 relative to the left eye display 724 so that the one or more left eye image capturing devices 728 can be positioned and oriented to capture images of the user's left eye as the user views the left eye display 724. In exemplary embodiments, the one or more right and left eye image capturing devices 722 and 724 can be infrared (IR) cameras configured to have a particular sensitive to IR light (e.g., to capture images of IR radiation).

The one or more right eye light emitting diodes 730 can be disposed in the housing 250 relative to the right eye display 722 and the one or more right eye light emitting diodes so that the one or more light emitting diodes 730 can be positioned and oriented to emit light towards the user's right eye as the user views the right eye display 722. Likewise, the one or more left eye light emitting diodes 732 can be disposed in the housing 750 relative to the left eye display 724 so that the one or more left eye light emitting diodes 732 can be positioned and oriented to emit light towards the user's left eye as the user views the left eye display 724. In exemplary embodiments, the one or more right and left eye light emitting diodes 730 and 732 can be infrared (IR) light emitting diodes configured to emit IR light.

The right eye controller 734 can be operatively coupled to the one or more right eye image capturing devices 726 to control an operation of the one or more right eye image capturing devices 726 and/or to process the images of the right eye captured by the one or more right eye image capturing devices 726. Likewise, the left eye controller 736 can be operatively coupled to the one or more left eye image capturing devices 728 to control an operation of the one or more left eye image capturing devices 728 and/or to process the images of the left eye captured by the one or more left eye image capturing devices 728. As one non-limiting example, the right and left eye controllers 734 and 736 can be configured to control a shutter, aperture, refresh rate, discharge rate, and the like of the one or more right and left eye image capturing devices 722 and 724, respectively. As another non-limiting example, the right and left eye controllers 734 and 736 can monitor and/or track the movement of the user's right and right eyes as the user views the right and left eye displays 726, respectively, which can be utilized by exemplary embodiments to effect vision therapy of the user for binocular dysfunctions. While separate controllers in the form of the right and left eye controllers 734 and 736 are utilized to control and interface with the right and left eye image capturing device 722 and 724, exemplary embodiments of the present disclosure can be implemented with a single integrated controller to control and interface with the right and left eye image capturing devices 722 and 724.

The one or more display controllers 738 can be operatively coupled to right and left eye displays 722 and 724 to control an operation of the right and left eye displays 722 and 724 in response to render the virtual reality scene. In exemplary embodiments, the one or more display controllers 738 can be configured to render images on the right and left eye displays of the same scene and/or objects, where images of the scene and/or objects are render at slightly different angles or points-of-view to facilitate the stereoscopic effect. In exemplary embodiments, the one or more display controllers 738 can include graphical processing units.

The one or more hardware interfaces 740 can facilitate communication between the virtual reality device 114 and other devices (e.g., servers 214, the computing device 600, and the like). The virtual reality device 114 can be configured to transmit data to the other devices via the one or more hardware interfaces 740. As one example, the one or more hardware interfaces 740 can be configured to receive data from the other devices and can be configured to transmit the data to the one or more display controllers 738, which can render the virtual reality scene on the right and left eye displays 722 and 724 to provide a virtual reality environment in three-dimensions (e.g., as a result of the stereoscopic effect).

The housing 750 can include a mounting structure and a display structure 754. The mounting structure allows a user to wear the virtual reality device 114 on his/her head and to position the display structure over his/her eyes to facilitate viewing of the right and left eye displays 722 and 724 by the right and left eyes of the user, respectively, while minimizing any light from the surrounding environment from reaching the user's eyes. The mounting structure can be configured to generally mount the head mounted virtual reality device 114 on a user's head in a secure and stable manner. As such, the virtual reality device 114 can generally remain fixed with respect to the user's head such that when the user moves his/her head left, right, up, and down, the virtual reality device 114 generally moves with the user's head.

The display structure 754 can be contoured to fit snug against a user's face to cover the user's eyes and to generally prevent light from the environment surrounding the user from reaching the user's eyes. The display structure 754 can include a right eye portal 756 and a left eye portal 758 formed therein. A right eye lens 760a can be disposed over the right eye portal and a left eye lens 760b can be disposed over the left eye portal. The right eye display 722, the one or more right eye image capturing devices 726, and the one or more right eye light emitting diodes 730 can be disposed within the display structure 754 behind the lens 760 covering the right eye portal 756 such that the lens 756 is disposed between the user's right eye and each of the right eye display 722, the one or more right eye image capturing devices 726, and the one or more right eye light emitting diodes 730. The left eye display 724, the one or more left eye image capturing devices 728, and the one or more left eye light emitting diodes 732 can be disposed within the display structure 754 behind the lens 760 covering the left eye portal 758 such that the lens 760 is disposed between the user's left eye and each of the left eye display 724, the one or more left eye image capturing devices 728, and the one or more left eye light emitting diodes 732.

While the one or more right eye image capturing devices 726 and the one or more right eye light emitting diodes 730 are described as being disposed behind the lens 760 covering the right eye portal as an example embodiment, in exemplary embodiments of the present disclosure the one or more right eye image capturing devices 726 and/or the one or more right eye light emitting diodes 730 can be disposed in front of and/or around the lens 760 covering the right eye portal such that lens 760 is not positioned between the user's right eye and the one or more right eye image capturing devices 726 and/or the one or more right eye light emitting diodes 730. Likewise, while the one or more left eye image capturing devices 728 and the one or more left eye light emitting diodes 732 are described as being disposed behind the lens 760 covering the left eye portal as an example embodiment, in exemplary embodiments of the present disclosure the one or more left eye image capturing devices 728 and/or the one or more left eye light emitting diodes 732 can be disposed in front of and/or around the lens 760 covering the left eye portal such that lens 760 is not positioned between the user's left eye and the one or more right eye image capturing devices 726 and/or the one or more right eye light emitting diodes 730.

The one or more sensors 762 can include depth sensors, motion sensors, magnetic sensors, infrared sensors to be configured to capture movement of the users hands and/or other body parts to aid in estimating the location and pose of the user. For example, markers can be placed on the users hands, and the cameras can detect the marker to determine a location and pose of the user's hands. The one or more sensors can include inertial sensors (e.g., accelerometers and gyroscopes), where an output of the one or more inertial sensors can be used to track the user's head movement and orientation, which can be used to update a field of view of the virtual reality scene being displayed to the user. Depth sensors, motion sensors, magnetic sensors, infrared sensors to be configured to capture movement of the users head and can be used in conjunction with the inertial sensors to enhance estimating user head movements. The one or more environmental sensors can be used to capture environmental data in the virtual reality environment. As described herein, images of objects (virtual or actual) can be processed to recognize objects and to extract attributes from the objects, where the attributes of the objects can provide environmental data in addition to or the alternative of using environmental sensors.

The virtual reality device 114 can also include one or more non-transitory computer-readable media for storing one or more computer-executable instructions or software for implementing exemplary embodiments, such as the platform 150, system 160, and/or components thereof. The non-transitory computer-readable media may include, but are not limited to, one or more types of hardware memory, non-transitory tangible media (for example, one or more magnetic storage disks, one or more optical disks, one or more flash drives), and the like. For example, memory 770 included may store computer-readable and computer-executable instructions or software for implementing exemplary embodiments. The virtual reality device can also include processor 772 and associated core 774, and optionally, one or more additional processor(s) 772' and associated core(s) 774', for executing instances of computer-readable and computer-executable instructions or software stored in the memory 770 and other programs for controlling system hardware. For example, the processor(s) 772, 772' can execute the platform 150, system 160, and/or components thereof to train one or more machine learning models and/or employ the one or more trained machine learning models to detect and/or correct user errors and/or to facilitate rendering and interaction with a virtual reality scene model. Processor 772 and processor(s) 772' may each be a single core processor or multiple core (774 and 774') processor and may be central processing units, graphical processing units, and the like.

While an example embodiment of the virtual reality device 114 has been illustrated including a virtual reality device having two displays, exemplary embodiments of the virtual reality display can be formed be a single display that is divided into a right eye portion and a left eye portion. In some embodiments, a mobile device, such as a smart phone, can be the virtual reality display device. Furthermore, an embodiment of the augmented reality device can be implemented using the head mounted display described in FIG. 7, except that the outward facing cameras on the head mounted display are configured to capture live video of the real-world physical location of the user, and the head mounted display is configured to render the live video on the display(s) to the user so that the user is viewing the real-world physical scene in real-time, where the head mounted display can augment the live video by super imposing, adding, or deleting object in the live video feed to generate a augmented reality scene.

Figure 8:
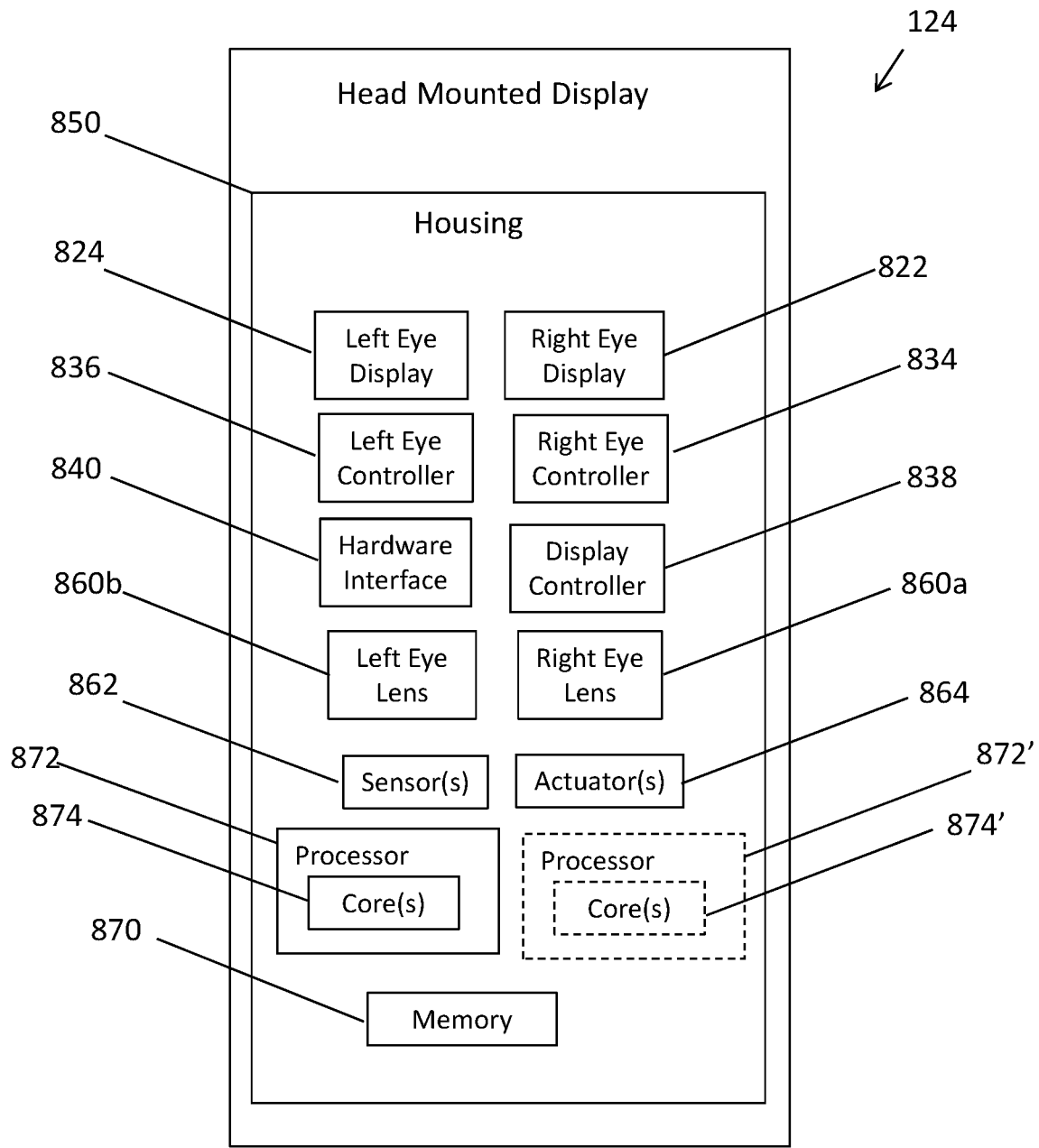
FIG. 8 is another exemplary head mounted display in accordance with embodiments of the present disclosure.

FIG. 8 is an exemplary embodiment of the augmented reality device 124 in accordance with embodiments of the present disclosure. The augmented reality device 124 can be a head mounted display that includes circuitry disposed within a housing 850. The circuitry can include a right eye display 822, a left eye display 824, a right eye controller 834, a left eye controller 836, one or more display controllers 838, one or more hardware interfaces 840, see-through lenses 860a, 860b, and/or one or more sensors 862 that can include, for example, outward facing cameras, depth sensors, magnetic sensors, infrared sensors, motion sensors, inertial sensors (e.g., accelerometers, gyroscopes), one or more environmental sensors, and/or any other sensors suitable for detecting and sense information in the augmented reality environment 120 (e.g., sensors 122). The virtual reality device 114 can also include one or more actuators 864 to provide guidance and/or feedback to the user. For example, the actuators 864 can include speakers, piezoelectric devices (for haptic feedback), illumination device (such as light emitting diodes), and/or any other suitable devices for providing guidance and/or feedback to the user.

The right and left eye displays 822 and 824 can be integrated with or otherwise formed with the lenses 860a and 860b such that the right eye display 822 is positioned to display images in front of the right eye of the user via lens 860a (e.g., projecting an image into or onto the lens 860a) when the housing 850 is mounted on the user's head and the left eye display 824 is positioned to display images in front of the left eye of the user via lens 860b (e.g., projecting an image into or onto the lens 860b) when the housing 850 is mounted on the user's head. In this configuration, the right eye display 822 and the left eye display 824 can be controlled by the one or more display controllers 838 to render images of an augmented reality scene model on the right and left eye displays 822 and 824 to induce a stereoscopic effect, which can be used to generate three-dimensional augmented reality scene, where virtual objects in the in the augmented reality scene can be perceived by the user's vision system as being at different depths.

The one or more display controllers 838 can be operatively coupled to right and left eye displays 822 and 824 to control an operation of the right and left eye displays 822 and 824 in response to render the augmented reality scene. In exemplary embodiments, the one or more display controllers 838 can be configured to render images on the right and left eye displays of the same scene and/or objects, where images of the scene and/or objects are render at slightly different angles or points-of-view to facilitate the stereoscopic effect. In exemplary embodiments, the one or more display controllers 838 can include graphical processing units.

The one or more hardware interfaces 840 can facilitate communication between the augmented reality device 124 and other devices (e.g., servers 414, the computing device 600, ground and aerial device such as drones, exoskeletons, haptic feedback device, and the like). The augmented reality device 124 can be configured to transmit data to the other devices via the one or more hardware interfaces 840. As one example, the one or more hardware interfaces 840 can be configured to receive data from the other devices and can be configured to transmit the data to the one or more display controllers 838, which can render the augmented reality scene on the right and left eye displays 822 and 824 to provide virtual objects in an augmented reality environment in three-dimensions (e.g., as a result of the stereoscopic effect).

The housing 850 can include a mounting structure that allows a user to wear the augmented reality device 124 on his/her head and to position the lenses 806a, 860b over his/her eyes to facilitate viewing images from the right and left eye displays 822 and 824 by the right and left eyes of the user, respectively, while allowing the user to view the surrounding real-world environment through the lenses 806a, 860b. The mounting structure can be configured to generally mount the head mounted augmented reality device 124 on a user's head in a secure and stable manner. As such, the augmented reality device 124 can generally remain fixed with respect to the user's head such that when the user moves his/her head left, right, up, and down, the virtual reality device 124 generally moves with the user's head. While an example embodiment is describes that includes lenses 860a and 806b, exemplary embodiments of can include a single lenses that extends over both the left and right eyes of the user.

The one or more sensors 862 can include depth sensors, motion sensors, magnetic sensors, infrared sensors to be configured to capture movement of the users hands and/or other body parts to aid in estimating the location and pose of the user. For example, markers can be placed on the users hands, and the cameras can detect the marker to determine a location and pose of the user's hands. The one or more sensors 862 can include inertial sensors (e.g., accelerometers and gyroscopes), where an output of the one or more inertial sensors can be used to track the user's head movement and orientation, which can be used to update a field of view of the augmented reality scene being displayed to the user. Depth sensors, motion sensors, magnetic sensors, infrared sensors to be configured to capture movement of the users head and can be used in conjunction with the inertial sensors to enhance estimating user head movements. The one or more environmental sensors can be used to capture environmental data in the virtual reality environment. As described herein, images of objects (virtual or actual) can be processed to recognize objects and to extract attributes from the objects, where the attributes of the objects can provide environmental data in addition to or the alternative of using environmental sensors.

The augmented reality device 124 can also include one or more non-transitory computer-readable media for storing one or more computer-executable instructions or software for implementing exemplary embodiments, such as the platform 150, system 160, and/or components thereof. The non-transitory computer-readable media may include, but are not limited to, one or more types of hardware memory, non-transitory tangible media (for example, one or more magnetic storage disks, one or more optical disks, one or more flash drives), and the like. For example, memory 870 included may store computer-readable and computer-executable instructions or software for implementing exemplary embodiments. The augmented reality device can also include processor 872 and associated core 874, and optionally, one or more additional processor(s) 872' and associated core(s) 874', for executing instances of computer-readable and computer-executable instructions or software stored in the memory 870 and other programs for controlling system hardware. For example, the processor(s) 872, 872' can execute the platform 150, system 160, and/or components thereof to train one or more machine learning models and/or employ the one or more trained machine learning models to detect and/or correct user errors, and/or to facilitate rendering and interaction with a augmented reality scene model. Processor 872 and processor(s) 802' may each be a single core processor or multiple core (874 and 874') processor and may be central processing units, graphical processing units, and the like.

While an example embodiment of the augmented reality device 124 has been illustrated including an augmented reality device having two displays, exemplary embodiments of the augmented reality display can be formed be a single display. In some embodiments, a mobile device, such as a smart phone, tablet, or other computing device can be the augmented reality display device.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A method for error detection in an augmented reality environment or a virtual reality environment, the method comprising:
   defining a data structure corresponding to a set of tasks;
   generating a virtual reality scene model to simulate a real-world, physical location;
   rendering the virtual reality scene model on a virtual reality device to immerse a user of the virtual reality device in the virtual reality scene model;
   capturing actions of the user simulating a performance of the set of tasks;
   training one or more machine learning algorithms to detect differences between the actions of the user and the set of tasks to generate one or more trained machine learning models;
   deploying the one or more trained machine learning models in an augmented reality environment or a virtual reality environment;

capturing actions of the user or a different user in a real-world, physical location, the user or the different user utilizing an augmented reality device;

executing the one or more trained machine learning models to determine whether the actions of the user or the different user are deviating from the set of tasks; and generating a feedback signal to correct the user or the different user in the augmented reality environment based on the one or more trained machine learning models determining at least one of the actions is deviating from a corresponding task in the set of tasks.

2. The method of claim 1, wherein the set of tasks have a hierarchical tree structure that define an ordered sequence of the tasks in the set.

3. The method of claim 2, wherein tasks in the set of tasks include at least one of audible cues, user movements, or user interaction with virtual objects.

4. The method of claim 1, further comprising:
receiving input from an observer of the user simulating the performance of the set of tasks, the input corresponding to the actions of the user and the set of tasks, wherein the input from the observer is utilized in training the one or more machine learning algorithms.

5. The method of claim 1, wherein capturing the actions of the user comprises:
capturing an audible output of the user, a movement of the user, and an interaction between the user and a virtual object.

6. The method of claim 1, wherein capturing the actions of the user or the different user comprises:
capturing an audible output of the user, a movement of the user or the different user, and an interaction between the user or the different user and an actual object.

7. The method of claim 6, wherein the one or more trained machine learning models include a first trained machine learning model and a second trained machine learning model, and executing the one or more trained machine learning models to determine whether the actions of the user or the different user are deviating from the set of tasks comprises:
executing the first trained machine learning model to determine deviations in the audible output; and
executing the second trained machine learning model to determine deviations in the movement of the user or the different user and in the interaction between the user or the different user and the actual object.

8. The method of claim 1, wherein the one or more trained machine learning models identify the actions of the user or the different user and determine whether actions as identified are occurring at a desired time.

9. The method of claim 1, further comprising:
capturing the actions of the user or a different user in the virtual reality scene model, the user or the different user utilizing the virtual reality device;
executing the one or more trained machine learning models to determine whether the actions of the user or the different user are deviating from the set of tasks; and
generating a feedback signal to correct the user or the different user in the virtual reality environment based on the one or more trained machine learning models determining at least one of the actions is deviating from a corresponding task in the set of tasks.

10. A system for error detection in an augmented reality environment or a virtual reality environment, the system comprising:

a virtual reality device;
one or more non-transitory computer-readable media storing a data structure corresponding to a set of tasks and instructions for training one or more machine learning algorithms; and
a processing device executing the instructions to:
generate a virtual reality scene model to simulate a real-world, physical location;
render the virtual reality scene model on the virtual reality device to immerse a user of the virtual reality device in the virtual reality scene model;
capture actions of the user simulating a performance of the set of tasks;
train the one or more machine learning algorithms to detect differences between the actions of the user and the set of tasks to generate one or more trained machine learning models; and
deploy the one or more trained machine learning models in an augmented reality environment or a virtual reality environment; and
wherein the processing device or a different processing device is programmed to:
capture actions of the user or a different user in a real-world, physical location, the user or the different user utilizing an augmented reality device;
execute the one or more trained machine learning models to determine whether the actions of the user or the different user are deviating from the set of tasks; and
generate a feedback signal to correct the user or the different user in the augmented reality environment based on the one or more trained machine learning models determining at least one of the actions is deviating from a corresponding task in the set of tasks.

11. The system of claim 10, wherein the set of tasks have a hierarchical tree structure that define an ordered sequence of the tasks in the set.

12. The system of claim 11, wherein the tasks include at least one of audible cues, user movements, or user interaction with objects.

13. The system of claim 10, wherein the processing device executes the instructions to:
receive input from an observer of the user simulating the performance of the set of tasks, the input corresponding to the actions of the user and the set of tasks, wherein the input from the observer is utilized in training the one or more machine learning algorithms.

14. The system of claim 10, wherein the processing device is programmed to capture the actions of the user by capturing an audible output of the user, a movement of the user, and an interaction between the user and a virtual object.

15. The system of claim 10, wherein the actions of the user of the different user are captured by capturing an audible output of the user, a movement of the user or the different user, and an interaction between the user or the different user and an actual object.

16. The system of claim 15, wherein the one or more trained machine learning models include a first trained machine learning model and a second trained machine learning model, the first trained machine learning model being executed to determine deviations in the audible output and the second trained machine learning model being executed to determine deviations in the movement of the user or the different user and in the interaction between the user or the different user and the actual object.

17. The system of claim 10, wherein the one or more trained machine learning models identify the actions of the user or the different user and determine whether the actions as identified are occurring at a desired time.

18. The system of claim 10, wherein the processing device or a different processing device is programmed to:
capture the actions of the user or a different user in the virtual reality scene model, the user or the different user utilizing the virtual reality device;
execute the one or more trained machine learning models to determine whether the actions of the user or the different user are deviating from the set of tasks; and
generate a feedback signal to correct the user or the different user in the virtual reality environment based on the one or more trained machine learning models determining at least one of the actions is deviating from a corresponding task in the set of tasks.

19. A non-transitory computer-readable medium comprising instructions, wherein execution of the instructions by a processing device causes the processing device to:
define a data structure corresponding to a set of tasks;
generate a virtual reality scene model to simulate a real-world, physical location;
render the virtual reality scene model on the virtual reality device to immerse a user of the virtual reality device in the virtual reality scene model;
capture actions of the user simulating a performance of the set of tasks;
train the one or more machine learning algorithms to detect differences between the actions of the user and the set of tasks to generate one or more trained machine learning models; and
deploy the one or more trained machine learning models in an augmented reality environment or a virtual reality environment;
capture actions of the user or a different user in a real-world, physical location, the user or the different user utilizing an augmented reality device;
execute the one or more trained machine learning models to determine whether the actions of the user or the different user are deviating from the set of tasks; and
generate a feedback signal to correct the user or the different user in the augmented reality environment based on the one or more trained machine learning models determining at least one of the actions is deviating from a corresponding task in the set of tasks.

* * * * *